United States Patent
Zmuda

[15] 3,662,575
[45] May 16, 1972

[54] METHOD AND APPARATUS FOR BENDING TUBING

[72] Inventor: Daniel A. Zmuda, Toledo, Ohio
[73] Assignee: Oldberg Manufacturing Company, Grand Haven, Mich.
[22] Filed: Feb. 26, 1970
[21] Appl. No.: 14,441

[52] U.S. Cl. ........................................72/21, 72/32, 72/297
[51] Int. Cl. ................................B21b 37/08, B21d 11/02
[58] Field of Search ..................72/3, 11, 12, 22, 26, 30, 32, 72/36, 216, 297, 310

[56] References Cited

UNITED STATES PATENTS

| 3,557,586 | 1/1971 | Zmuda | 72/22 |
| 2,430,217 | 11/1947 | Eastes | 72/27 |
| 2,405,750 | 8/1946 | Lampe, Sr. | 72/32 |
| R24,726 | 10/1959 | Franck | 72/32 |
| 1,349,219 | 8/1920 | Moore et al. | 72/387 |
| 1,816,218 | 7/1931 | Henry et al. | 72/369 |

*Primary Examiner*—Richard J. Herbst
*Assistant Examiner*—Michael J. Keenan
*Attorney*—Harry O. Ernsberger

[57] ABSTRACT

The disclosure embraces a method of and apparatus for forming or impressing successive bends in tubing, such as exhaust pipes and tail pipes particularly for replacement purposes in internal combustion engine exhaust systems of automotive vehicles, the method and apparatus providing for forming successive bends of various depths and angularities and especially involved and improved method and means for indexing the tubing for spacing the bends and indexing the depth and angularity for each bend while maintaining positive control of the tubing during the successive operations to assure the desired orientation of the bends in the tubing.

20 Claims, 30 Drawing Figures

INVENTOR.
DANIEL A. ZMUDA
BY
Harry O. Ernsberger
ATTORNEY

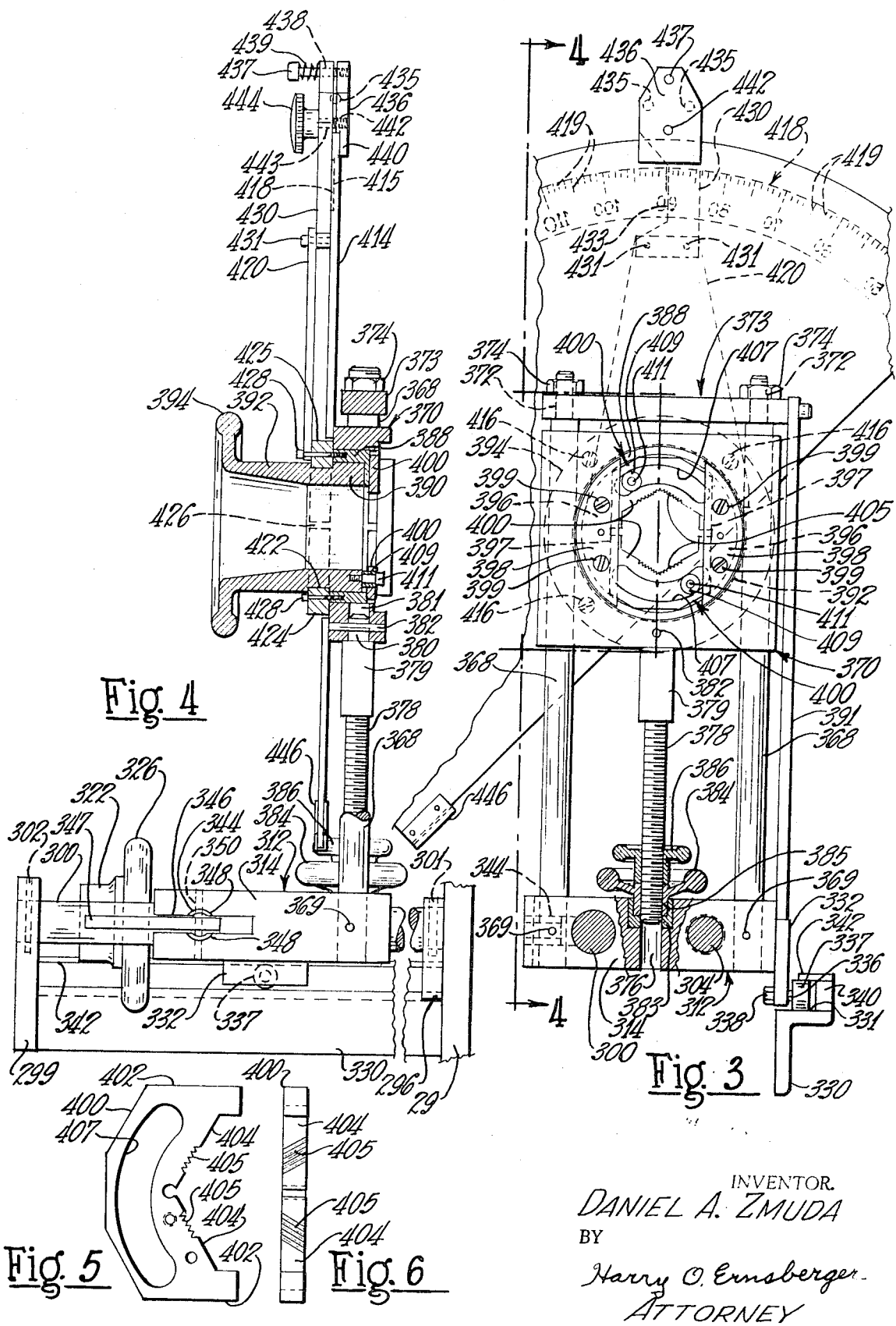

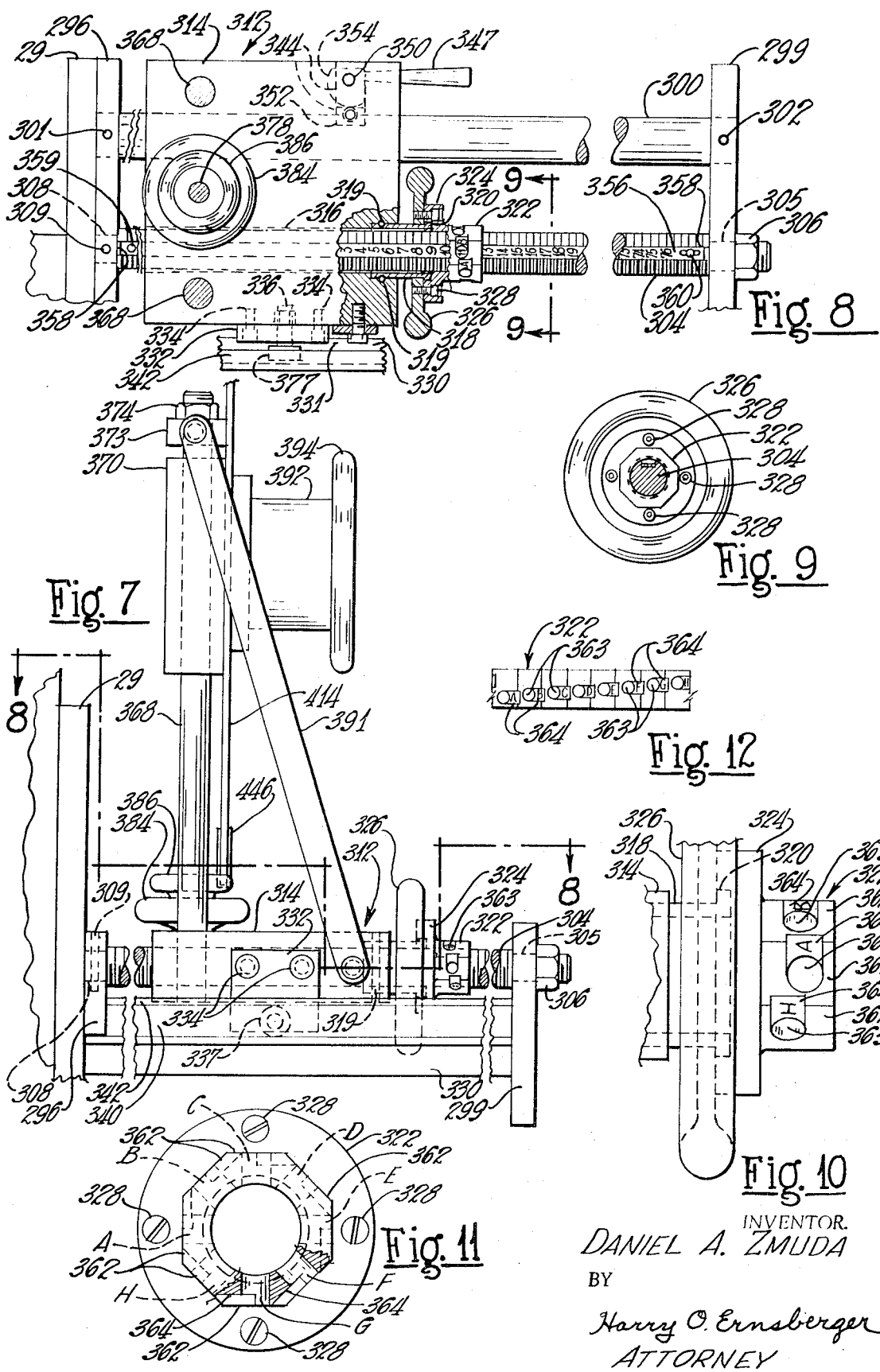

INVENTOR.
DANIEL A. ZMUDA
BY
Harry O. Ernsberger
ATTORNEY

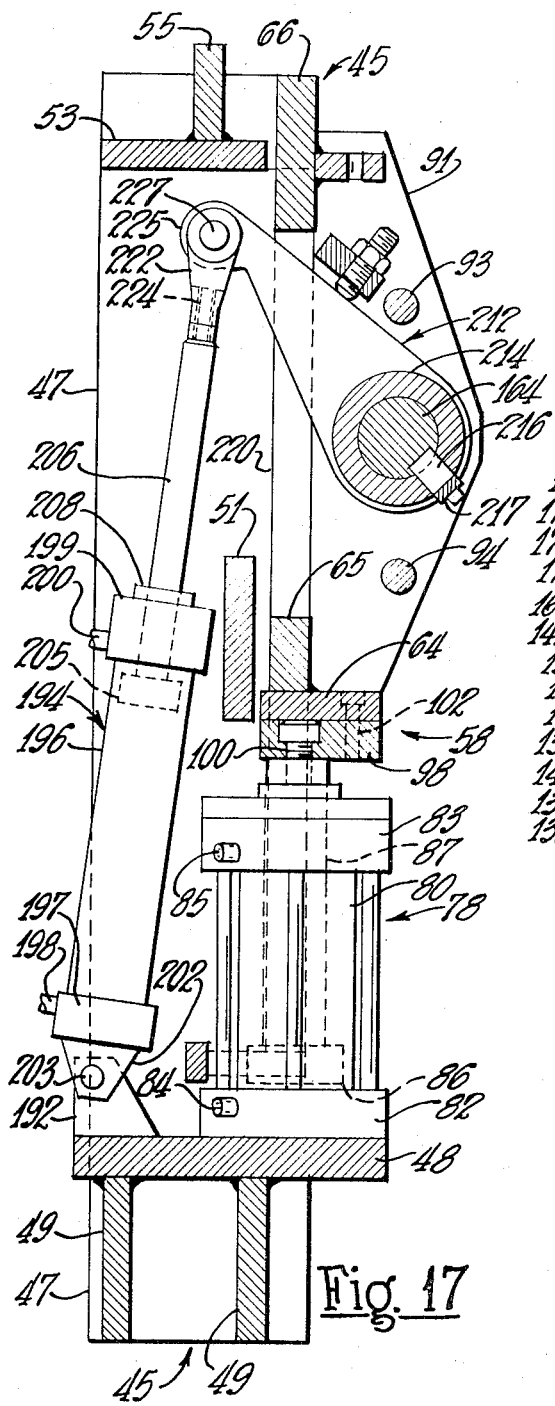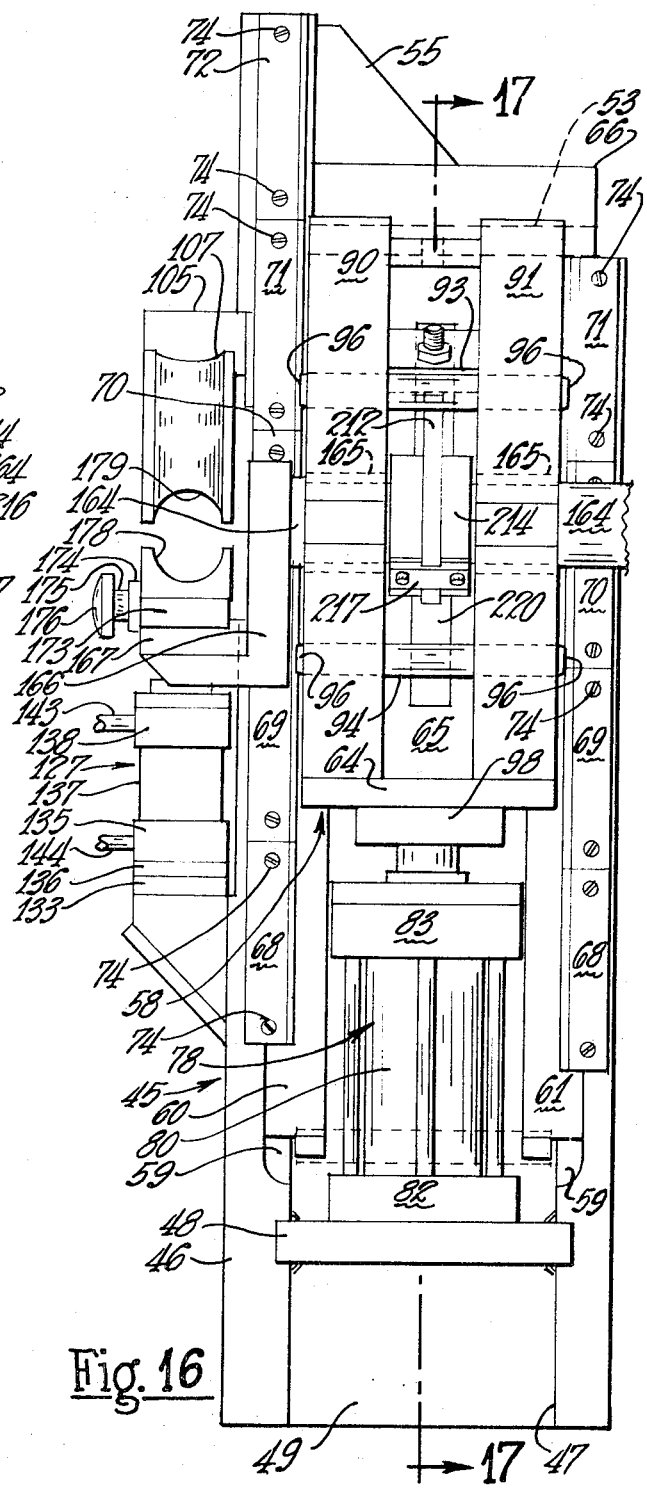

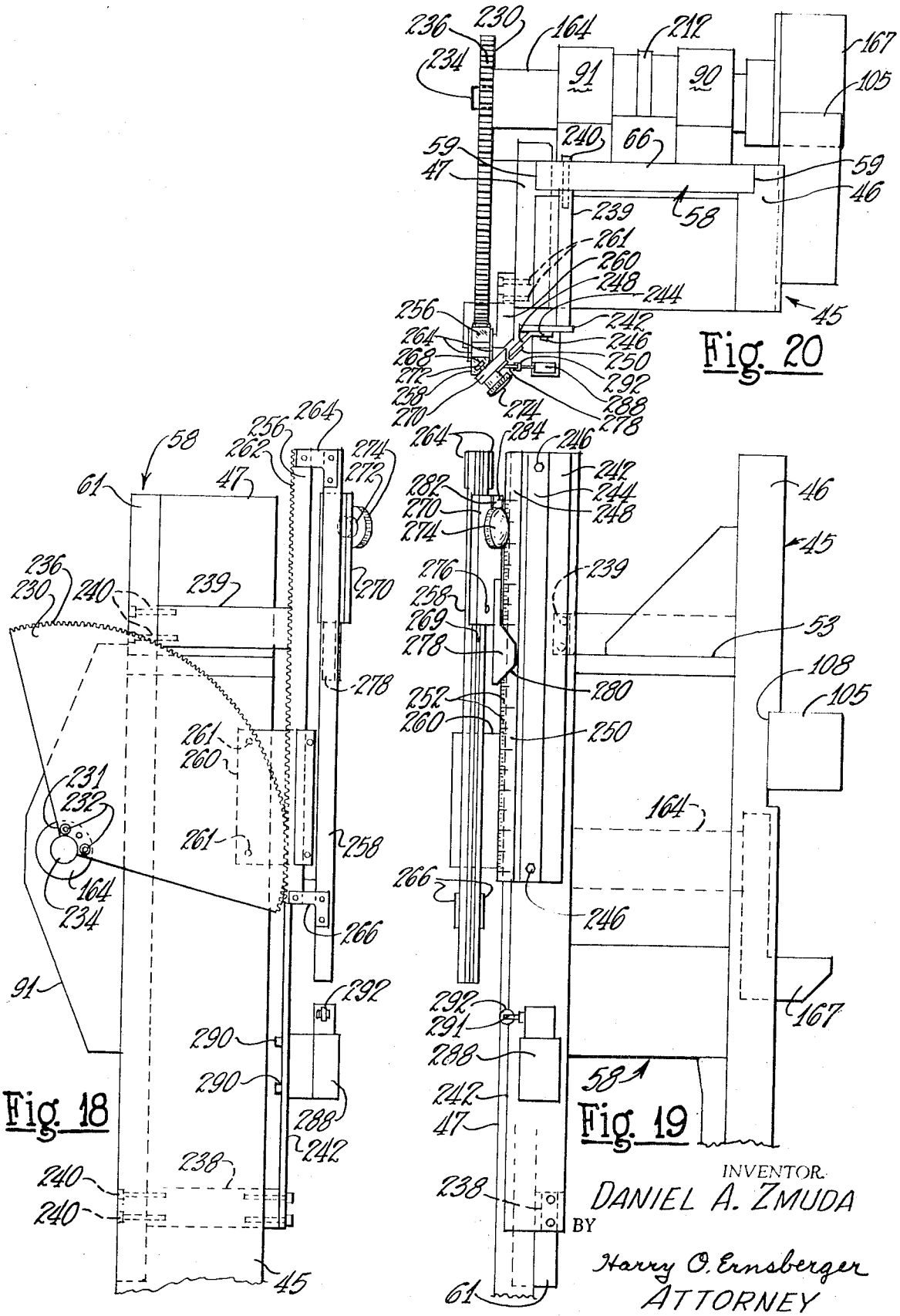

INVENTOR.
DANIEL A. ZMUDA
BY
Harry O. Ernsberger
ATTORNEY

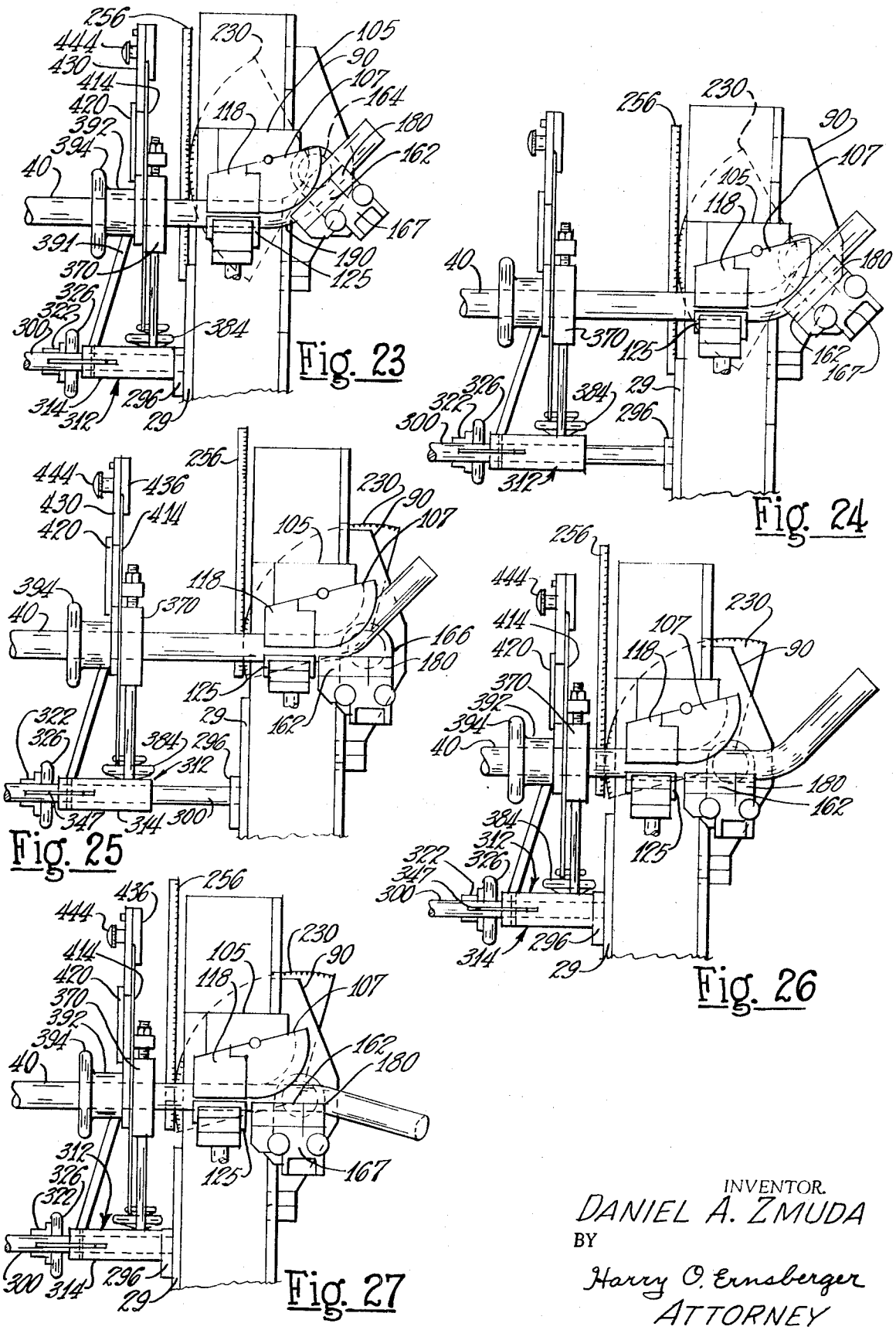

METHOD AND APPARATUS FOR BENDING TUBING

The invention relates to a method of and apparatus for bending tubing or tubular stock or the like and more especially to a method of and apparatus for forming or impressing successive bends in exhaust pipe and tail pipe and exercising positive control of the tubing or tubular stock at all times during lengthwise indexing of the tubing and the performance of successive bends in the tubing to assure accurate orientation of spacing, angularity and depth of successive bends in the formed tubing, exhaust or tail pipe.

Automotive vehicles manufactured in recent years and at the present time have comparatively low silhouettes and the frame constructions of automotive vehicles necessarily embody cross frame members and struts in order to provide necessary strength characteristics. It is conventional practice to provide an exhaust gas conveying system for conveying gases from the engine through one or more sound attenuating instrumentalities or mufflers and through a tail pipe for discharge of the gases usually rearwardly of the vehicle. In fashioning an exhaust gas system for the purpose it is necessary to impress or form many bends of various depths and angularities in exhaust pipes and tail pipes in order to avoid interference with the vehicle frame members or struts, the exhaust pipes and tail pipes usually being several feet in length. In the production of quantities of an exhaust pipe or a tail pipe having a particular pattern of bends, comparatively large forming presses are employed equipped with a reciprocable bending die or ram cooperating with movable bending shoes or wing dies in forming bends in a tube. In forming successive bends in tubing on a press of this character, adjustable stops are arranged in various positions relative to the press and are successively engaged by the pipe or tubing after each bend by manual movement of the tube by an operator so that the formed pipe or tube embodies a particular orientation pattern of bends.

By reason of a comparatively large number of types of automotive vehicles, each model or type usually requires a pipe having a particular number and orientation of bends so as to be properly assembled as a replacement with the chassis frame of a vehicle. Heretofore in fashioning exhaust pipe and tail pipe for replacement purposes, large quantities of pipe of the same shape or contour are produced on a press with one set of adjustments of the stops before the initiation of production of a different type requiring a re-adjustment of all of the stops engaged by the pipe or tube for carrying out the bending operations. The formed pipes or tubes are then stored until sold to customers desiring a replacement exhaust pipe or tail pipe for a particular automotive vehicle. The storage of the large inventory of formed pipes or tubes requires large covered storage areas at various distribution stations and involves a complex inventory control, these factors rendering the production and distribution of exhaust pipes and tail pipes for replacement very costly. The distributor outlets must necessarily carry a substantial inventory of formed exhaust pipes and tail pipes for various models of automotive vehicles in order to readily supply garages and service establishments when a particular exhaust pipe or tail pipe is needed for replacement.

The present invention embraces a method of forming successive spaced bends in a pipe or tubular stock wherein the pipe or tubular stock is under positive control through each step of a series of method steps in forming bends in a pipe or tubular stock whereby each of the bends may be formed of desired depth and angularity and the proper distances between successive bends assured so that the formed exhaust pipe or tail pipe will accurately conform to the requirements for replacement installation on a particular model of automobile.

Another object of the invention embraces a method wherein a straight length of thin-walled metal tube, such as tubing used for exhaust pipes and tail pipes of exhaust gas systems, is successively advanced as successive bends are formed in the pipe wherein the extent of advancement of the pipe between successive bends may be accurately controlled by an indicating or indexing means to provide accurate spacing between successive bends while at all times maintaining positive control of the movement of the tube or pipe.

Another object of the invention embraces a method of and means for forming successive bends in a straight length of thinwalled metal tube wherein the straight length portion is positively clamped in a fixed position during each bending operation and, after each bending operation and advance of the tube preparatory to the formation of a successive bend, the rotation of the tube is controlled to assure accurate and proper angularity of a bend.

Another object of the invention resides in a method of and apparatus for indexing the depth of a bend through a rectilinearly movable indexing means associated with power interrupting means to interrupt the bending of the pipe when a desired depth of bend has been formed in the tube.

Another object of the invention embraces a method utilizing a pressure-actuated instrumentality for bending a pipe or tubular stock and utilizing counteracting forces in a manner to effect a formation of a bend with a minimum of forces.

Another object of the invention resides in an apparatus for forming successive spaced bends in a tube, the apparatus being disposed to accommodate the tube with bent regions without the necessity of providing a floor pit or special clearance space for the bent tube.

Another object of the invention embraces an apparatus for impressing or forming successive bends in a length of metal tubing wherein positive control is at all times exercised over the positioning, advancing movements and bending of the tubing to attain a configurated tube with successive bends of desired spacing, angularity and depth.

Another object of the invention resides in a pipe bending apparatus of comparatively small compact construction which is readily portable and is equipped with control devices and instrumentation rendering it adaptable for forming successive bends in a length of pipe wherein the spacing between successive bends may be of different dimensions and the bends of different depths and different angularities to enable the fashioning of an exhaust pipe or tail pipe for replacement which substantially conforms to the original.

Another object of the invention resides in an apparatus embodying a single bending member for bending thin-walled metal tubing about a relatively fixed matrix in forming a bend, the apparatus embodying means for securely clamping the tubing to prevent appreciable stretching of the tubing other than at the region of the bend being formed.

Another object of the invention resides in a bending apparatus embodying a single bending instrumentality for bending tubing about a matrix in a manner whereby application of force to the bending instrumentality effects initial lateral displacement or distortion of the tubing to promote preliminary flow of the metal at the start of a bending operation to form a bend in the tubing without the use of a mandrel.

Another object of the invention is the provision of a bending apparatus for bending tubular stock wherein the clamping and bending components are readily interchangeable to accommodate tubular stock of various diameters.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 3 is an enlarged sectional view taken substantially on the line 3—3 of FIG. 1;

FIG. 4 is a view taken substantially on the line 4—4 of FIG. 3;

FIG. 5 is a detail elevational view of one of the tube gripping members shown in FIG. 3;

FIG. 6 is an end view of the tube gripping member shown in FIG. 5;

FIG. 7 is an elevational view of the opposite side of the construction shown in FIG. 4;

FIG. 8 is a plan view, partly in section, of the construction shown in FIG. 7, the view being taken substantially on the line 8—8 of FIG. 7;

FIG. 9 is a detail sectional view taken substantially on the line 9—9 of FIG. 8;

FIG. 10 is an enlarged elevational view of an indexing bushing shown in FIG. 8;

FIG. 11 is an end elevational view with certain portions shown in section of the indexing bushing shown in FIG. 10;

FIG. 12 is a developed view of the sight openings in the indexing bushing shown in FIGS. 10 and 11;

FIG. 16 is a side elevational view of a portion of the construction illustrated in FIG. 1;

FIG. 17 is a vertical sectional view taken substantially on the line 17—17 of FIG. 16;

FIG. 18 is a side elevational view of the mechanism for determining the depth of bend in a tube;

FIG. 19 is a front elevational view of the arrangement shown in FIG. 18;

FIG. 20 is a top plan view of the arrangement shown in FIG. 19;

FIG. 23 illustrates the position of the tube bending shoe at the completion of a bend;

FIG. 24 illustrates the step of repositioning the carriage at the completion of a bend in the tube;

FIG. 25 illustrates the withdrawn position of the bending shoe after the completion of a bend shown in FIG. 24;

FIG. 26 illustrates the tube advanced by the carriage to a position for a subsequent bending operation;

FIG. 27 illustrates the tube rotated through a desired angle at which a subsequent bend is to be formed;

Figure 1:
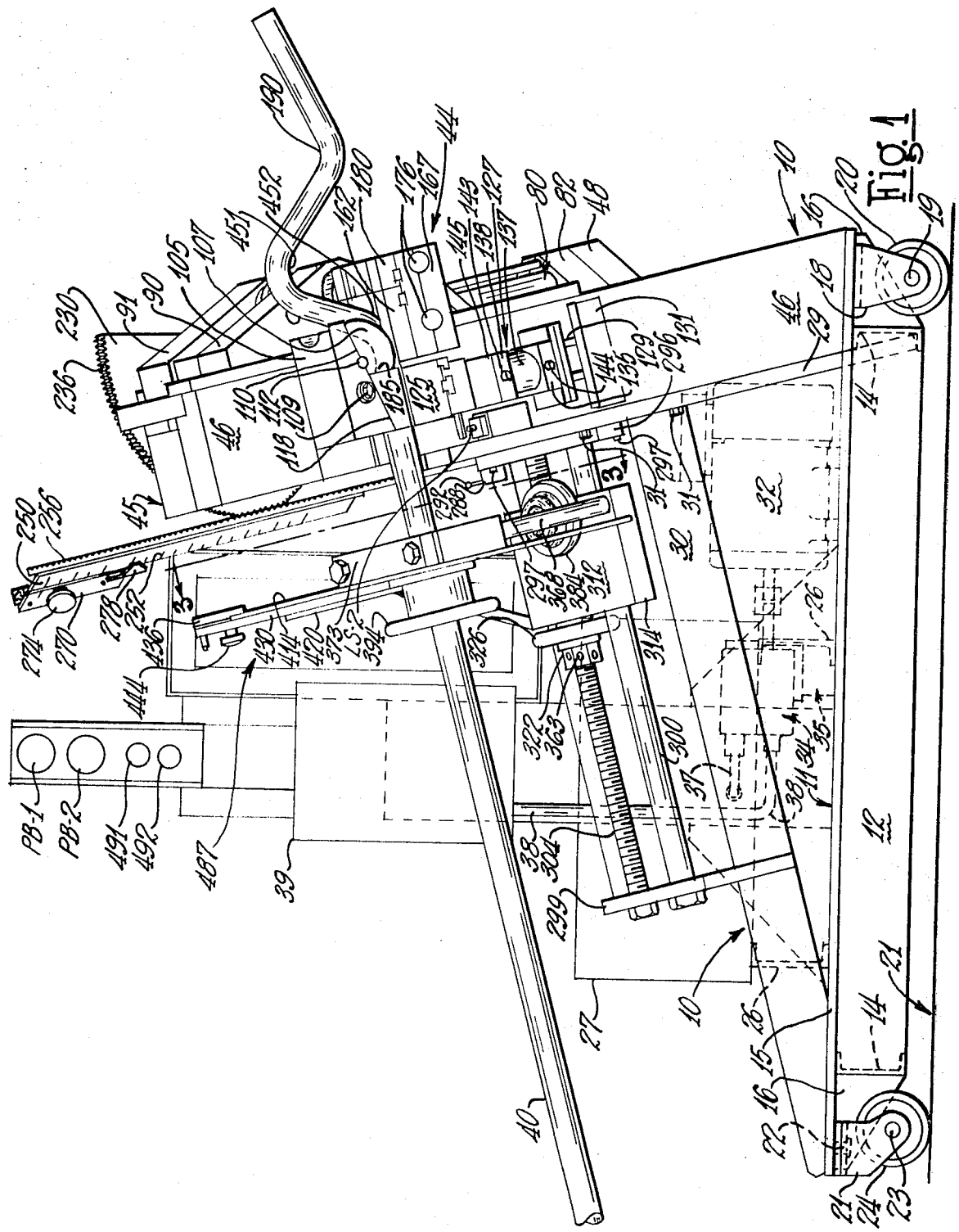
FIG. 1 is a front elevational view of a tube bending apparatus of the invention.

While the method of and apparatus for bending pipe are particularly usable for impressing or forming a plurality of successive bends in metal pipe, tube or tubular stock utilized as exhaust pipes or tail pipes for exhaust gas systems for internal combustion engines, it is to be understood that the method and apparatus of the invention may be employed for bending pipe or tubular stock into various contours and configurations for any purpose where it is desired to utilize bent pipe or tubing.

In the embodiment illustrated in the drawings, the tube bending apparatus is supported by a frame structure preferably mounted on caster wheels for portability. However, the frame structure may be directly supported on a floor or other surface. Referring to the drawings and initially to FIGS. 1 and 2, the frame 10 is inclusive of a base structure 11 comprising parallel side members 12 welded to the ends of transversely extending frame members 14, the members 12 and 14 supporting a metal platform 15, the base structure 11 being of substantially rectangular shape.

As shown in FIG. 1, the platform 15 extends beyond the ends of the side frame members 12, the extending portions being supported upon reinforcing plates 16 welded to the end members 14 and the end regions of the platform 15. Welded to the right-hand end region of the platform 15, as viewed in FIG. 1, are inverted U-shaped brackets 18 supporting stub shafts 19 on which are journaled caster wheels 20. Secured to the corner regions of the platform 15 at the opposite end are transversely spaced brackets 21 swivelly supported upon pins 22, the brackets 21 having stub shafts 23 on which caster wheels 24 are journally supported, this arrangement facilitating portability of the bending apparatus.

Mounted upon the platform 15 are transversely disposed parallel support members 26 on which is mounted a tank or reservoir 27 containing fluid, such as oil, for operating the hydraulic actuators for performing method steps in bending pipe or tubing. Mounted upon the base construction 11 is a plate-like frame member 29 which preferably extends through a slot in the platform 10 and engages the transverse frame member 14, as shown in FIG. 1. The plate member 29 is slightly inclined from a perpendicular position upwardly in a left-hand direction as viewed in FIG. 1 for a purpose hereinafter explained.

Transversely spaced struts 30 have their ends welded respectively to the frame member 29 and an end region of the platform 15. Supported on the platform 15 is an electrically energizable motor 32 which drives a hydraulic pump 34 supported on a bracket 35 mounted upon the platform 15.

The inlet pipe 37 of the pump is connected with the tank or reservoir 27 and the outlet pipe 38 of the pump is connected with a hydraulic distribution manifold 39 from which fluid conveying tubes (not shown) convey oil from the distribution manifold to the hydraulically actuated components through suitable electrically actuated valves of conventional construction.

The arrangement for impressing or forming successive bends in tubing, tubular stock or pipe 40 is of a character wherein the operative components for controlling the tube or pipe 40 and forming bends therein are fashioned and oriented to provide a modular unit 44 adapted to be mounted on the plate 29 of the frame structure and secured to the plate by bolts 31, or the modular unit may be mounted or supported on a frame structure of other configuration. The modular unit 44 comprises a frame structure 45, in the embodiment illustrated, the frame structure of the unit being fashioned of plates or members welded into a unitary structure.

The frame of the modular unit 44 includes transversely spaced parallel plates 46 and 47 particularly shown in FIGS. 1, 2, 16 and 17. Joining a lower region of the plates and secured thereto is a member or plate 48. Reinforcing plates 49 are welded to the member 48 and the members 46 and 47 to provide adequate support for the platform provided by member 48. Joining the plates 46 and 47 at an intermediate region is a transversely extending plate 51, shown in FIG. 17, the plate 51 being welded at its end regions to plates 46 and 47.

Disposed between the upper regions of the plates 46 and 47 is a transversely extending plate 53, one end of the plate being welded to the upper end of plate 47, the other end of the plate being welded to member 46 at a region spaced from the upper end of member 46 as shown in FIG. 16. A reinforcing or gusset plate 55 is welded to the plate 53 and to the upwardly extending plate 46 as shown in FIGS. 16 and 17.

In the embodiment illustrated, a tube clamping means, a tube bending means including a reciprocable carriage or slide and hydraulic actuators for the movable components are supported upon the modular frame structure 45. The slidable carriage, slide or ram 58 is mounted in ways or tracks provided by lengthwise recesses 59 in the plates or frame members 46 and 47. The slide or carriage 58 is inclusive of spaced parallel plates 60 and 61, shown in FIG. 16, the plates are joined by transverse members 64, 65 and 66. The plates 60 and 61 are retained in the recesses 59 by pairs of plates 68, 69, 70 and 71 and a plate 72, the plates being secured to the parallel members 46 and 47 by means of screws 74.

The members 60 and 61 are of a thickness so as to be snugly, yet slidably, movable or slidable in the recesses 59 and are guided by the walls of the recesses and the retaining plates 68, 69, 70, 71 and 72. A hydraulic actuator 78 is provided for reciprocating the slide or carriage 58 and the components associated therewith. The hydraulic actuator 78 is inclusive of a cylinder 80 and cylinder heads 82 and 83. The hydraulic actuator 78 is supported by the platform 48 of the main frame 45, the cylinder head 82 engaging the platform 48.

Figure 2:
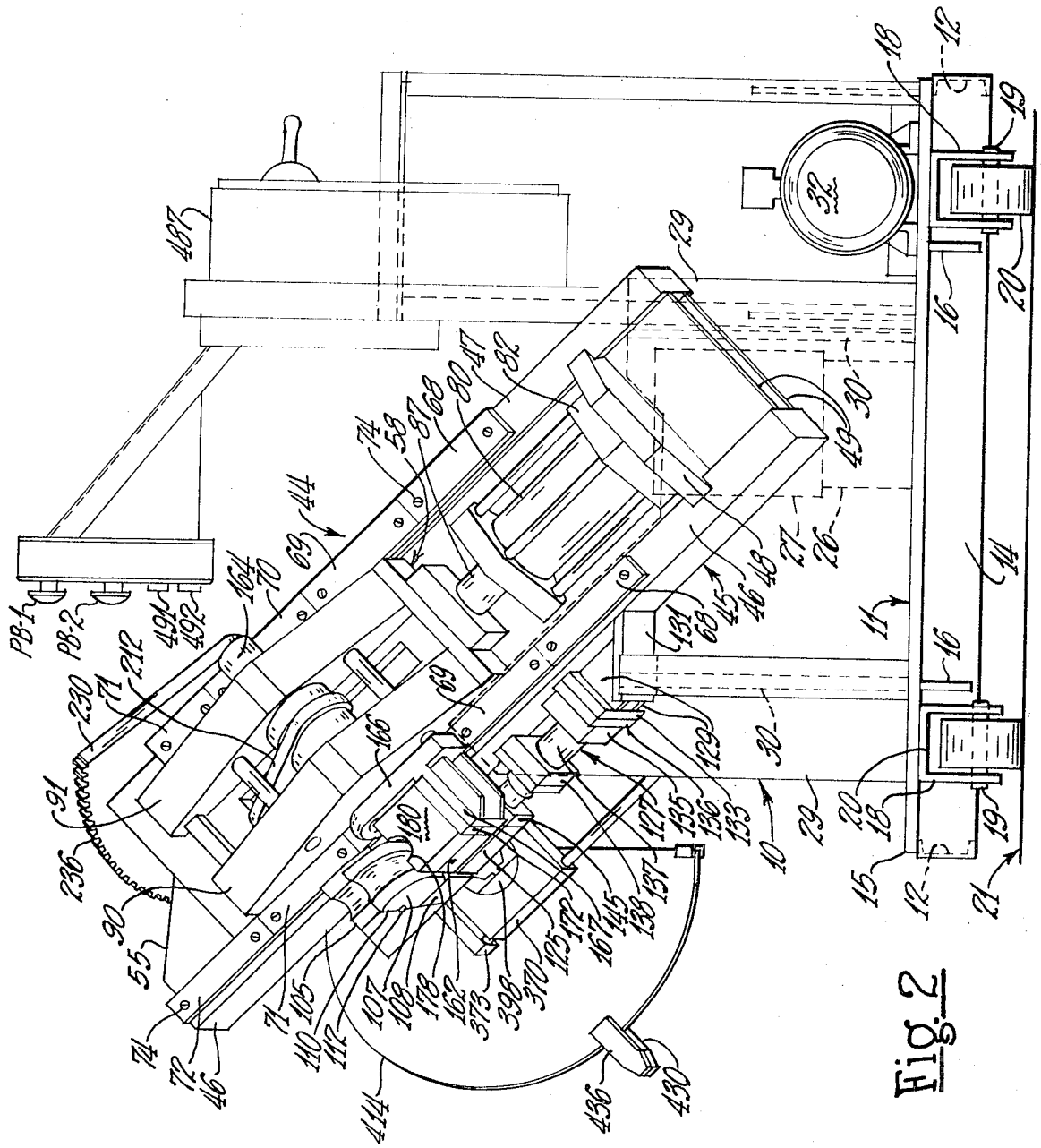
FIG. 2 is an elevational view of the right-hand side of the apparatus shown in FIG. 1.

The cylinder heads 82 and 83 are provided respectively with fluid conveying tubes 84 and 85 through which fluid, such as oil, is introduced into and exhausted from the cylinder 80 for reciprocating a piston 86 slidable in the cylinder 80. The piston 86 is mounted upon a piston rod 87 which extends through a stuffing gland in the upper cylinder head 83. The slide construction or slide means 58 is adapted to be reciprocated in the guide ways by the hydraulic actuator 78 to effect a bending operation in a tube or pipe. The slide construction includes lengthwise-arranged members or plates 90 and 91 in spaced relation as shown in FIGS. 2 and 16, the member 90 being welded to the slide member 60 and the member 91 welded to the slide member 61.

The members 90 and 91 are also welded to the transversely extending members 64, 65 and 66. The members 90 and 91 are provided with pairs of aligned openings into which reinforcing rods 93 and 94 are snugly fitted, the ends of the rods extending beyond the outer surfaces of members 90 and 91 and are welded to the respective members as shown at 96 in FIG. 16. The rods 93 and 94 rigidly hold the members 90 and 91 in spaced relation.

As shown in FIG. 17, a member 98 is secured to the upper end of the piston rod 87 by a threaded member or bolt 100 shown in FIG. 17. The member 98 is secured to the transversely extending member 64 by securing bolts 102, one of which is shown in broken lines in FIG. 17. Through this arrangement, movement of the piston 86 in the cylinder 80 reciprocates the slide member 58 including the components 90 and 91.

With particular reference to FIGS. 1, 2, 13 and 19, there is secured to member 46 an abutment block 105 which forms a bolster member providing support for a stationary die or matrix 107 about which a tube is to be bent in performing a bending operation. The abutment or bolster block 105 extends into a recess 108 in member 46, shown in FIGS. 14 and 19, and is welded or otherwise fixedly secured to member 46. The abutment block 105 is initially secured to member 46 by a bolt 109 preparatory to the welding operation. The abutment block 105 is fashioned with its lower surface 110 at an angle with respect to the longitudinal axis of the frame member 46.

Figure 13:
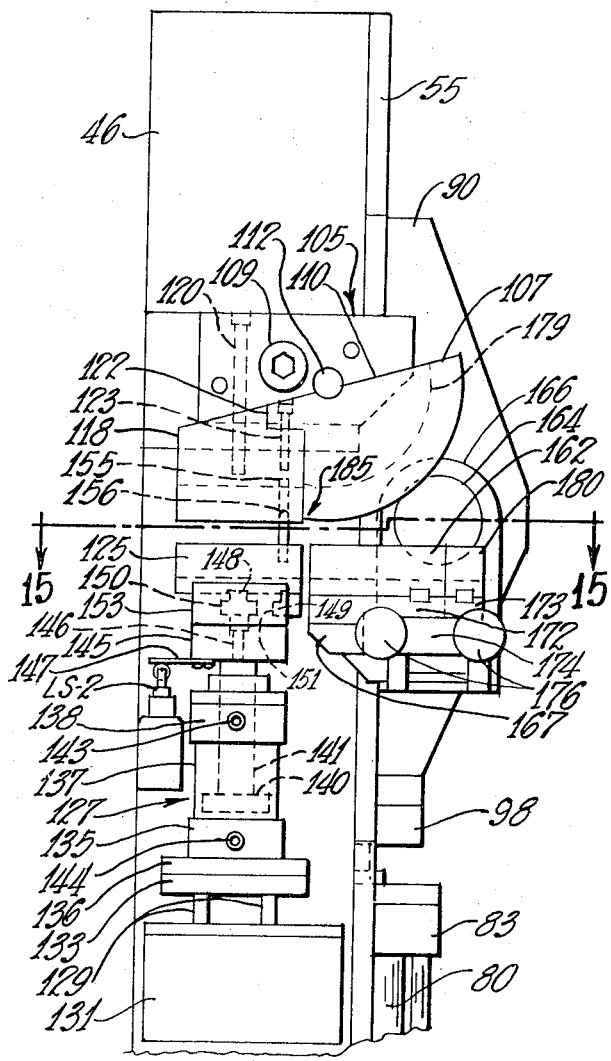
FIG. 13 is an enlarged front elevational view of a portion of the construction illustrated in FIG. 1.

The stationary die or matrix 107 is provided with a surface which mates with and abuts against the surface 110 as shown in FIGS. 1, 2 and 13. A dowel 112 is pressed into a bore formed in the member 46, the abutment block 105 and the die 107 each being formed with a portion of semicylindrical configuration engaging the dowel 112 for positively positioning the die 107 with respect to the abutment block 105. The die 107 is secured to the bolster or backing member 105 by means of bolts 114, shown in FIG. 22.

Clamp means is provided for securely holding a tube adjacent a region to be bent during a bending operation. The clamp means includes a stationary clamp section 118, shown in FIGS. 1, 2, 13, 14 and 22, which abuts against the angular surface 110 of the abutment block 105 and is secured to the block by a bolt 120, shown in FIG. 13, and suitable dowels (not shown).

The upper section 118 of the tube clamping means is fashioned with a recess to accommodate a projection 122 on the stationary die 107, the overlapping portions of the clamp section 118 and the stationary die 107 being secured together by a securing bolt 123.

The tube clamping means includes a relatively movable clamp section 125 shown in FIGS. 1, 2, 13, 14, 16 and 22. A hydraulic actuator 127 is provided for actuating the movable tube clamping section 125. Welded or otherwise secured to the member 46 are spaced vertically extending brackets 129 having angular lower edges 130. A reinforcing plate 131 is welded to the brackets 129 and the lower edge of the plate 131 welded to the member 46, this arrangement being particularly shown in FIGS. 2, 13 and 14. Welded to the upper edges of the plates 129 is a platform or bolster 133.

Mounted on the platform or support member 133 is an end head 135 of a hydraulic cylinder 137, the cylinder having an upper end head 138. The lower end head 135 has a base or flange portion 136 which is secured by bolts (not shown) to the platform 133. Reciprocably disposed in the cylinder 137 is a piston 140, shown in broken lines in FIG. 13, mounted upon the end of a piston rod 141, the latter extending upwardly through a stuffing gland (not shown) in an upper cylinder head 138. The upper and lower heads are respectively equipped with fluid conveying tubes 143 and 144 to facilitate fluid flow into and out of the cylinder 137 for reciprocating the piston 140.

Mounted on the upper end of the piston rod 141 is a member 145 secured to the piston rod by a bolt 146. Removably secured to the member 145 is a clamp section 125 being laterally movable, a T-shaped slot 150 in the member 145 slidably accommodating a T-shaped key 150 secured to the movable clamp section 125 and a slot 151 accommodating an L-shaped key 149 secured to the clamp section 125, this arrangement being shown in broken lines particularly in FIG. 13. The movable clamp section 125 is secured in proper aligned position with a bending die or shoe by a plate 153 secured to the member 145 by screws (not shown).

Figure 14:
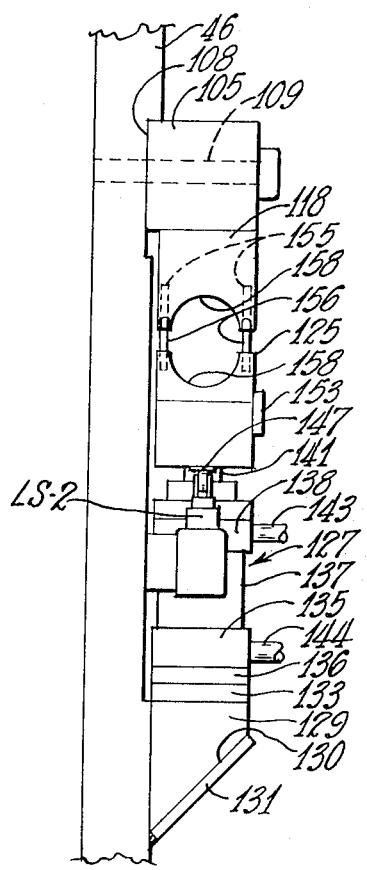
FIG. 14 is a side elevational view of the construction shown in FIG. 13.

By making the movable clamp section 125 readily removable from its support block 145, clamp sections for tubes of different diameters may be quickly interchanged. As shown in FIGS. 13 and 14, the upper or stationary clamp section 118 is fashioned with bores 155, and the movable clamp section 125 equipped with dowel pins 156 which extend into and are slidable in the bores 155 to properly align the clamp sections 118 and 125. Each of the mating clamp sections 118 and 125 is configurated with semicylindrical interior surfaces or recesses 158, the recesses, in mating relation, providing a substantially cylindrical clamping area or bore for clamping engagement with a tube 40.

Figure 15:
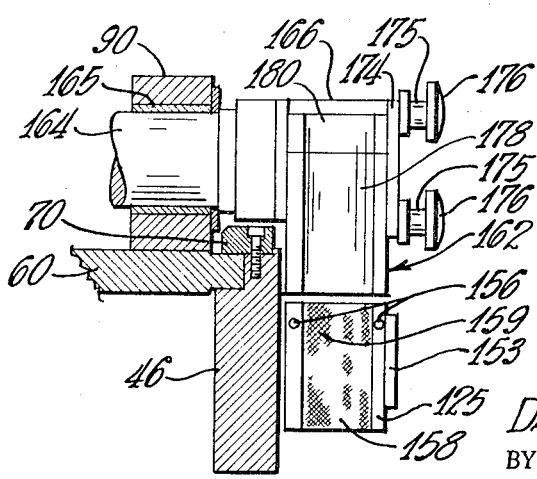
FIG. 15 is a detail sectional view taken substantially on the line 15—15 of FIG. 13.

The interior surface of each of the semicylindrical recesses 140 is fashioned with a diamond-shaped knurling or knurled configuration 159, schematically illustrated in FIG. 15.

The diamond-shaped knurling in the pipe clamping areas or regions of the clamp sections 118 and 125 provides a plurality of closely spaced minute projections of pyramidal shape, the apices of the projections extending toward the axis of the recess.

Figures 21, 22:
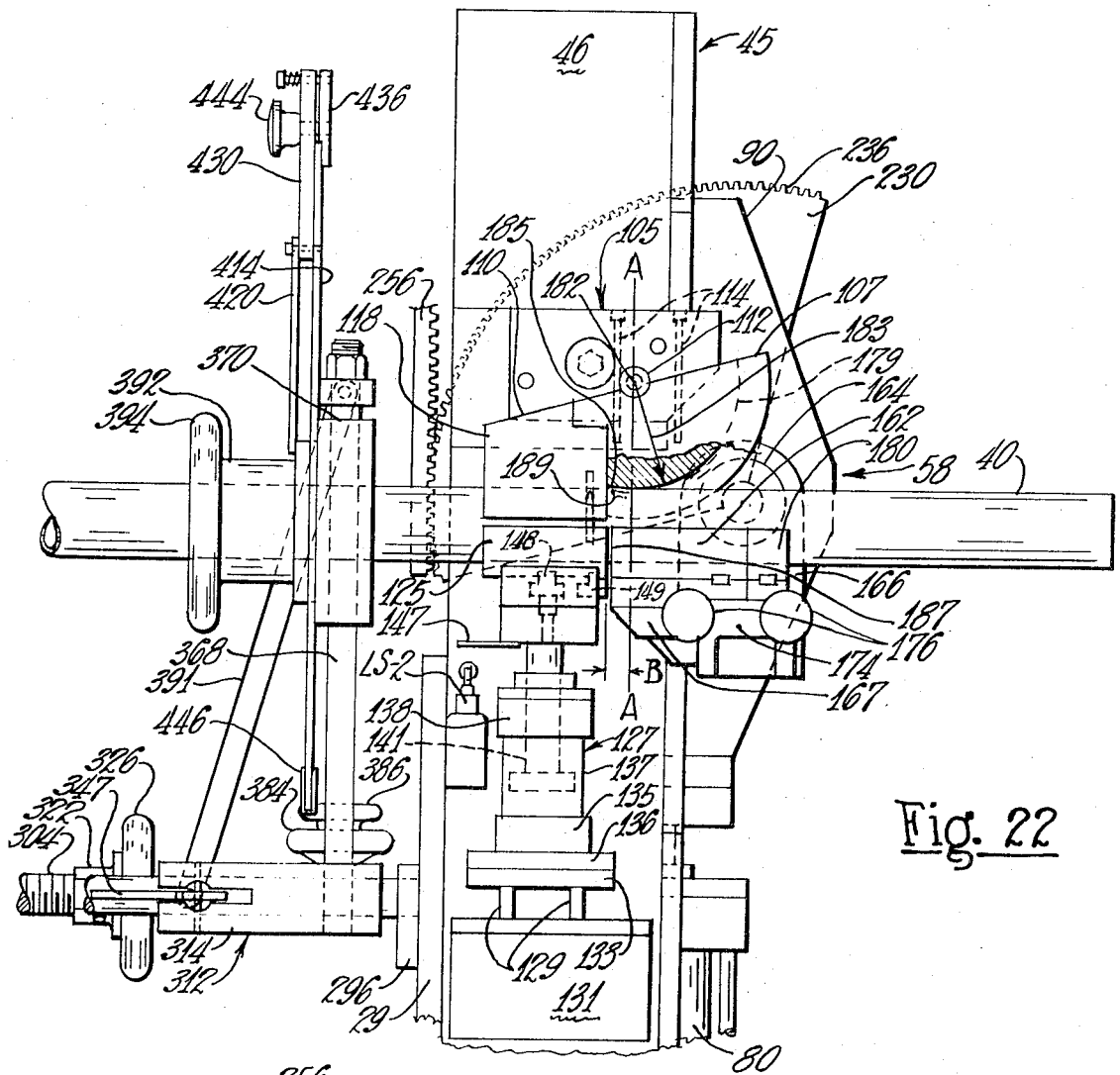
FIG. 21 is a fragmentary front elevational view illustrating the tube advancing carriage and a tube in position to be clamped preparatory to making a bend in the tube.
FIG. 22 is an enlarged view of the arrangement illustrated in FIG. 18 with the tube in clamped position and illustrating the initial step of engaging the bending shoe with the tube at the start of a bending operation.

When the clamp sections 118 and 125 are in tube engaging position, as shown in FIGS. 1 and 22, and pressure exerted against the tube 40 by the hydraulic actuator 127 on the section 125, the apices or sharp points, provided by the diamond-shaped knurling in the tube engaging areas 158 of the clamp sections, slightly indent the exterior surface of the metal tube and thereby positively prevent endwise movement of the rectilinear portion of the tube 40 during a bending operation.

The apparatus includes a tube bending shoe or die 162, also referred to herein as a wing die, which is mounted for movement with a crank member or crankshaft 164 journally mounted in bearings 165 carried by members 90 and 91 of the slide construction 58, shown in FIG. 16. Integral with one end of the shaft 164 is an L-shaped portion or crank 166, the forwardly extending portion 167 providing a platform which provides support for the tube bending instrumentality, bending die or bending shoe 162. The platform supports a bolster block or spacer 172, the bending shoe 162 being mounted directly on the spacer block 172.

Spacer blocks of different thicknesses are interchangeable for accommodating bending dies for tubes of different diameters. The rear surface of the spacer block 172 seats against a ledge formed on the platform 167. Disposed at the frontal surface of the block 172 is a plate 174 having openings accommodating locking screws 175 having manipulating heads or knobs 176. The bending shoe or wing die 162 mounted on the block 172 is fashioned with a semicylindrical recess or configuration 178 to accommodate the lower half of a tube or pipe 40. The stationary die or matrix 107 is fashioned with a curved recess 179 of semicircular shape in cross section to accommodate the upper half of a tube or pipe 40 during a bending operation.

The bending die or shoe 162 is supplemented by a short length bending die or shoe section 180 also having a semicylindrical recess providing, in effect, an extension of the semicylindrical recess 178 of the die or shoe 162 shown in FIGS. 15 and 16. A supplemental spacer block 173 is provided for the supplemental bending shoe 180. The bending die sections 162 and 180 are secured to the spacing blocks 172 and 173 by bolts (not shown). Keys and keyways, shown in FIGS. 1 and 13 are provided between the spacer blocks and the bending shoe sections 162 and 180 to position the spacing blocks and bending die or shoe sections in proper relation.

By tightening the screws 175, shown in FIGS. 15 and 16, the plate 174 is brought into snug engagement with the frontal surface of the spacer blocks 172 and 173 to hold the block and the bending shoe sections 162 and 180 in fixed relation on the platform portion 167 of the crank 164.

The spacer block 172 is made removable in order to accommodate bending shoes for bending pipes of different diameters, each pipe size requiring a spacer block of a different thickness. The bending shoe construction including the main section 162 and the supplemental section 180 are normally used together in impressing bends in pipe or tubular stock.

In instances where successive bends in a pipe or tube are comparatively close together and project in different directions radially from the rectilinear axis of the tube or pipe, the supplemental bending shoe section 180 and the associated spacer block 173 may be easily removed by backing off the clamping screws 175 through manipulation of the screw heads 176. Thus successive bends in close relation may be fashioned by the single bending shoe section 162 by temporarily removing the short length bending shoe section 180 and the spacer block 173. The matrix 107 and the bending die sections 162 and 180 are preferably fashioned of brass or other suitable metal to assure long life.

As shown in FIG. 22, there is an important relationship between the axis 182 of the dowel 112, the movable bending die or shoe 162 and the clamping die components 118 and 125. The axis 182 of the dowel 112 is the generatrix of the root or bottom of the curve or radius 183 of the curved recess 179 of semicircular cross section of the stationary die or matrix 107.

As shown in FIG. 22, a plane A—A normal to the axis of the tube in clamped position between the clamping dies 118 and 125 passes through the center curvature of the stationary die configuration 179, the plane A—A being spaced from the end of the stationary clamp 118, a distance indicated at B in FIG. 22.

In the apparatus the distance B is preferably of about three-fourths of an inch. As shown in FIG. 22, the radius 183, defining the root of the recess or groove 179, is continued to the left of the plane A—A to provide a generally triangular space or pocket 185. The adjacent end surface 187 of the bending die 162 is disposed close to the clamping die 125, the portion of the bending die 162 to the left of the plane A—A overlapping a portion of the space provided by the curved surface 179 of the stationary die at the left of the plane A—A, as shown in FIG. 22.

The portion of the bending die 162 at the left of the plane A—A forces the adjacent metal of the tube or pipe 40 into the pocket 185 of triangular cross section. The substantially triangular space or pocket 185 provides a region into which the adjacent metal of the tube or pipe is first moved or cold flowed upon initial engagement of the bending shoe or wing die 162 with the tube or pipe, the displaced or laterally moved metal of the tube being shown in FIG. 22.

The pressure or force of initial engagement of the bending die or shoe 162 with the pipe 40 initiates or effects lateral movement or flow of the metal of the pipe into the space 185 preliminary to a bending movement of the bending shoe 162. The preflowing or initial movement of metal of the pipe into the pocket or space 185 is important in the formation of a bend as actual movement or flow of the metal has begun before a bending action is initiated. Concomitantly with the establishment of initial flow of the metal of the tube into the space 185, upward pressure of the bending shoe 162 starts the formation of a bend, the bending shoe rotating about the axis of the crankshaft 164.

As the crankshaft 164 is journaled in bearings in members 90 and 91 forming components of the slide 58, upward movement of the slide by hydraulic pressure applied beneath the piston 86 in the cylinder 80, shown in FIGS. 16 and 17, effects rotation of the movable bending shoe about the upwardly moving axis of the crankshaft, a motion which effects a wrapping or wiping of the bending shoe 162 about the periphery of the fixed bending die or matrix 107 to form a bend in the pipe 40. The preflowing of the metal of the tube into the pocket 185 promotes the forming of a smooth bend in the pipe or tube 40 without any wrinkles or any collapsing of the tube at the interior radius of the bend in the pipe.

The clamping member or jaw 125, shown in FIG. 13, under hydraulic pressure exerted beneath the piston 140 in the cylinder 137, clamps the tube between the jaws 118 and 125, the pressure exerting a gripping force on the pipe or tube 40 during a bending operation whereby the region of the pipe held between the clamping jaws is not appreciably stretched so that during bending, the metal is cold flowed around the curved configuration of the stationary bending die or matrix 107. The lateral preflowing of the metal into the pocket 185 is exemplified at the raised ridge-like portion 189 in FIG. 28, this figure illustrating a bend 190 formed in the pipe 40.

The metal of the pipe disposed in the pocket 185 is also effective to resist stretching of the region of the tube gripped by the clamping members 118 and 125. To insure proper bending of the tube or pipe by the wrapping or bending action of the bending shoe 162 about the tube in bending the tube around a region of the stationary die 107, it is necessary to provide a backing pressure or reaction force on the bending die or bending shoe 162 during rotational movement of the bending die in forming a bend. The backing or reaction pressure should be substantially constant during a bending operation and of substantially lesser pressure than the pressure exerted on the bending shoe in a pipe bending direction.

In the embodiment illustrated, the backing force or pressure is provided by hydraulic pressure acting against a piston in a cylinder in conjunction with a pressure relief means to meter or bleed liquid out of the cylinder to maintain substantially constant the reaction force or backing pressure resisting rotation of the bending shoe 162.

Figure 29:
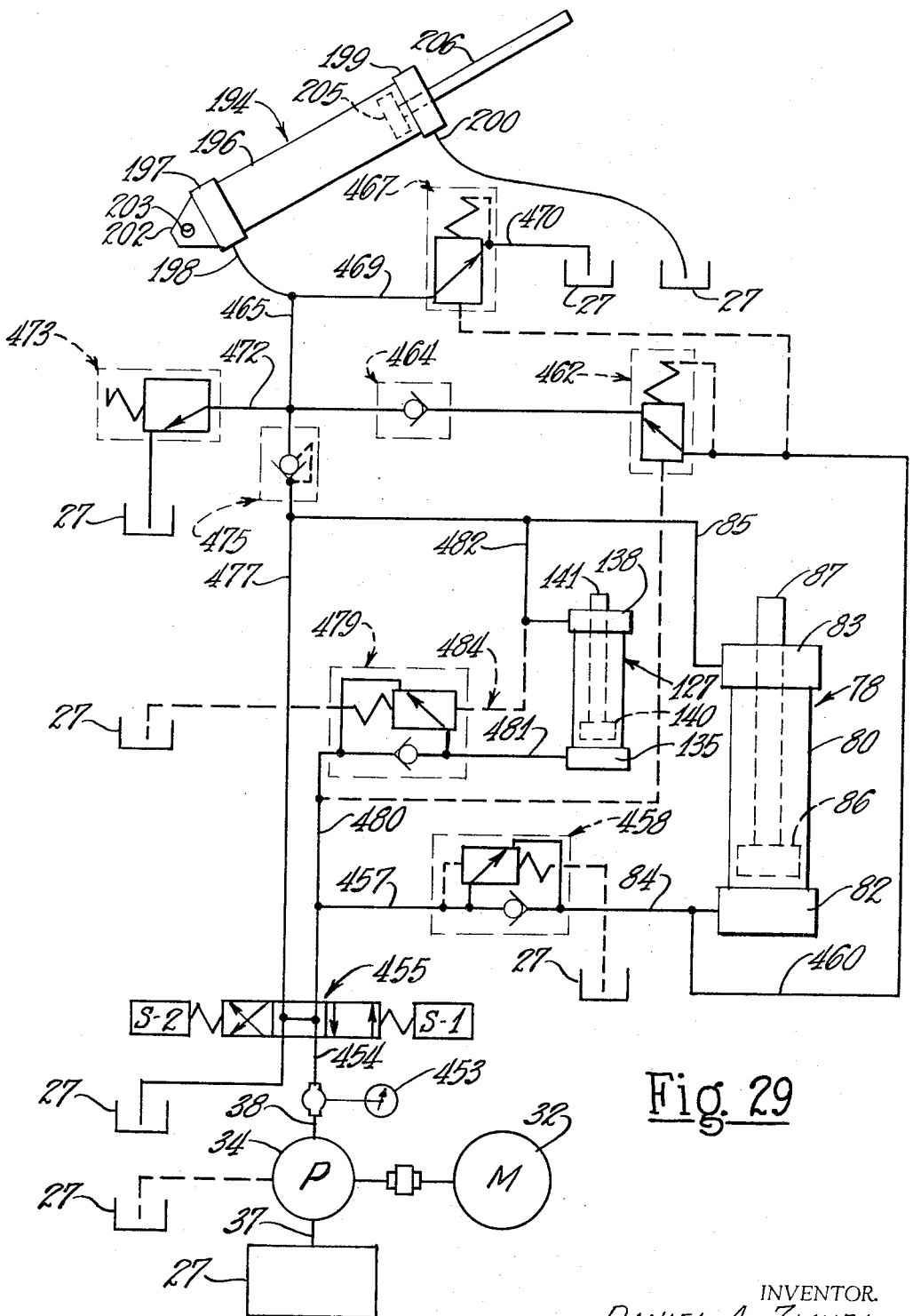
FIG. 29 is a schematic diagram of the hydraulic circuits and actuators for the tube bending apparatus.

An arrangement for accomplishing this function is illustrated in FIGS. 16, 17 and 29. As particularly shown in FIG. 17, an anchor member 192 is welded or otherwise secured to member 48 of the main frame.

The reaction force means 194 includes a cylinder 196 which is provided with end heads 197 and 199, the lower end head 197 being fashioned with a clevis or bifurcated portion 202 which straddles the projection or anchor member 192. The clevis 202 and the member 192 have aligned openings accommodating a clevis pin 203 establishing a pivotal support for the cylinder 196. The heads 197 and 199 are provided respectively with fluid or liquid conveying tubes 198 and 200 for conveying liquid into and out of the cylinder 196. Reciprocably disposed within cylinder 196 is a piston 205 secured on the end of a piston rod 206, the piston rod extending through the end head 199.

A stuffing gland 208 is associated with the end head 199 to prevent leakage of liquid along the rod 206. Fixedly secured on the crankshaft 164 is an arm or member 212 having a boss portion 214 bored to snugly receive the shaft 164. A key 216 extends through the boss portion and into a recess in the shaft 164 for securely mounting the arm for rotation with the shaft. The key 216 is secured in place by a plate 217. The slide construction 58 has a vertical slot or open area 220 accommodating swinging movement of the arm 212. Mounted upon the upper end of the piston rod 206 is a clevis member 222 secured to the rod by a threaded means or screw 224.

An integral end portion 225 of the arm 212 is straddled by the clevis 222, the clevis and the end portion 225 having aligned openings accommodating a pivot pin 227. Through this arrangement, liquid in the cylinder 196 beneath the piston 205 resists rotation of the tube bending shoe 162 when the latter is moving in a tube bending direction, the flow of liquid out of the cylinder through the tube 198 being metered or regulated by a pressure relief valve 467 shown schematically in FIG. 29. Through the action of metering flow of liquid out of the cylinder 196 through the relief valve 467, sufficient and substantially constant backing pressure of the liquid in the cylinder 196 resists, but does not prevent, rotation of the bending shoe 162 during upward movement of the slide construction 45.

A method and means are provided for regulating or adjusting the angular extent or depth of a bend being formed in a tube or pipe. The arrangement for accomplishing this function is shown in FIGS. 1, 2 and 18 through 22. In the arrangement illustrated a compound rotatable and rectilinear motion of a member is transferred to a rectilinearly movable member, the latter being equipped with adjustable means movable in a rectilinear direction for determining the extent or depth of a bend to be formed in a pipe. With particular reference to FIGS. 2, 18 and 20 there is illustrated a sector-shaped member 230, having a hub portion 231 secured to the end of the crankshaft 164 by means of bolts 232.

The end of the crankshaft 164 has a tenon portion 234 which mates with a curved region of the hub portion 231 to properly position the member 230 with respect to the crankshaft 164. The sector-shaped member 230 has its curved peripheral region fashioned with teeth 236, shown in FIGS. 1, 2, 18 and 20. Mounted upon the plate 61 of the slide or carriage 58 are rearwardly extending brackets 238 and 239 secured to the slide plate 61 by screws 240, one of which is shown in broken lines in FIGS. 18 and 20. Secured to the outer ends of brackets 238 and 239 is an elongated plate or member 242 parallel with the slide plate 61 and movable with the slide or carriage 58.

Mounted on the plate or member 242 and extending parallel therewith is a bar or gage support 244 secured to member 242 by bolts 246. The member 244 is fashioned with an angularly arranged portion 248 preferably disposed at a 45° angle with respect to the portion of the bar 244 contiguous with the plate 242. Secured to the angular portion 248 of member 242 is a rectilinear scale 250 bearing graduations or indicia 252 indicating, degrees of angularity of bend to be fashioned in a tubing or pipe 40.

Means is provided for supporting a rectilinearly movable rack bar 256 and a way bar 258. Mounted on the frame member 47 is a support, bracket or means 260 secured to the frame member by screws 261. The bracket 260 is fashioned with a lengthwise recess snugly, yet slidably accommodating the toothed rack 256. The teeth 262 of the rack 256 are enmeshed with the teeth 236 of the sector 230.

Secured to the ends of the rack member 256 are pairs of L-shaped brackets 264 and 266. Disposed in parallelism with the rack member 256 and secured to the pairs of brackets 264 and 266 is the bar or way 258.

As shown in FIG. 20, the way or bar 258 is fashioned with a slot 268 of T-shaped cross section extending full length of the way 258. Mounted upon the way or bar 258 is a slidable element 270 arranged for slidable movement lengthwise along the bar or way 258. The element 270 has an opening accommodating a headed bolt 272, the bolt extending through an opening in the element 270. The head of the bolt 272 is engaged in the recess 268. The shank portion of the bolt extends through an opening in the element 270 and the threaded portion of the bolt shank is equipped with a knob 274.

The element 270 is provided with a dowel pin 276 which extends into the throat 269 of the T-shaped recess 268 for guiding the element 270 in its slidable movements along the bar or way 258. Fixedly secured to the element 270 is a cam member or cam plate 278 having an angularly arranged cam surface 280. The element 270 is provided with an index plate 282, the upper surface of which lies in the plane of the surface of the scale 250. The index plate 282 has an index or index line 284 for cooperation with the graduations or indicia 252 on the scale 250.

Through manipulation of the knob 274, the headed bolt 272 may be released and the element 270 slidably adjusted along the way or bar 258 to bring the index line 282 into selective registry with graduations 252 on the scale 250 which are spaced to indicate degrees of depth of bend to be formed in a tube or pipe 40. Secured to the member 242 of the slide construction 58 is a housing 288 enclosing a limit switch means LS-2, shown schematically in FIG. 30, the housing being secured to member 242 by bolts 290. The limit switch means LS-2 includes a movable switch member 291 mounting a cam follower or roller 292, the latter being disposed in the path of travel of the cam surface 280 of the cam plate 278.

Engagement of the cam surface 280 with the cam follower 292 actuates the limit switch means energizing a valve means to interrupt further flow of liquid beneath the piston 86 in the cylinder, stopping movement of the slide 58, thereby completing the formation of a bend of the desired angularity or depth for which member 270 has been set. The housing 288 mounting the limit switch means LS-2 is movable with the slide 58.

During the formation of a bend, the slide 58 moves upwardly relative to the frame 45 and the rack member 256 and the member 258, carrying the member 270 and cam plate 278, move downwardly, as viewed in FIGS. 18 and 19, under the influence of rotation of the toothed sector 230 until the cam follower or roller 292 engages the cam surface 280 of the cam plate 278, thereby interrupting further movement of the bending shoe 178 in forming a bend in the tube or pipe.

The depth of bend to be formed in the pipe is dependent upon the relative adjustment of the cam plate 278 along the member 258, the plate being adjustable by manipulation of the knob 274 cooperating with the threaded bolt 272.

The tube bending apparatus is inclusive of means for maintaining accurate and positive control of the position of the tube 40 and for indexing the pipe lengthwise between successive bends whereby the finished tube will accurately conform in shape to a predetermined configuration. The control means is inclusive of an arrangement for clamping the tube 40, means for rotating the tube to predetermine the direction of angularity of a bend to be formed in the tube, and means for advancing the tube through a predetermined distance after the formation of a bend therein to reposition the tube preparatory to the formation of a succeeding bend.

The arrangement for accomplishing these functions is more particularly illustrated in FIGS. 3 through 11 and 21 through 27. Referring initially to FIGS. 3 through 11, the tube clamping and control means is inclusive of a support means comprising a plate 296 secured to the frame member 29 by bolts or securing means 297, and a plate 299 welded or otherwise secured to the frame member 30, shown in FIG. 1. The plates 296 and 299 are bored to snugly receive and support a shaft, bar or way 300, the bar being fixedly secured in the bores in the plates 296 and 299 by dowel pins 301 and 302, shown in FIG. 8.

Disposed between and secured to the plates 296 and 299 is a threaded member 304 preferably fashioned with a square-type thread such as used on a conventional lead screw of a machine tool. As particularly shown in FIG. 8, the threaded member 304 is fashioned with a tenon portion 305 extending through a bore in the plate 299, the member 304 being secured to the plate by a nut 306 on a threaded portion of the tenon 304. The opposite end of the threaded member 304 is provided with a tenon 308 extending into a bore in the plate 296 and is secured in the bore by a dowel pin 309.

Mounted upon the bar or way 300 and on the threaded member 304 is a carriage 312. The carriage 312 is inclusive of a block or plate 314 having a bore which snugly accommodates the bar or way 300 but with sufficient clearance to facilitate slidable movement of the plate 314 along the bar or way. The member or block 314 is provided with a second smooth bore 316 accommodating the threaded shaft or member 304. The block 314 is fashioned with a counterbore adjacent and aligned with the bore 316 accommodating a bushing 318 having at one end a flange portion 320.

The bushing is fixedly secured in the counterbore by means of dowels 319. Threadedly mounted upon the threaded shaft 304 is a member or nut 322, the interior of which is fashioned with a spiral thread of square-type cross section for cooperation with the threads on the shafts 304. The nut 322 is fashioned with a flange 324 fashioned with a circular recess accommodating the flange 320 of the bushing 318 in the manner shown in FIGS. 8 and 10, the nut 322 being rotatable relative to the bushing 318.

Secured to the flange 324 of the nut 322 is a manually operable means or hand wheel 326 secured to the flange 324 by bolts or threaded members 328. As shown in FIGS. 8 and 10, the hand wheel 326 has a bore accommodating a bushing 318, the portion of the hand wheel adjacent the bushing 318 overlapping the flange 320 of the bushing 318. The hand wheel 326 and the nut 322 are rotatable relative to the bushing 318 and the threaded shaft 304. Through the interconnection of the bushing 318 with the hand wheel 326 and the nut 322, rotation of the nut and the hand wheel moves the carriage plate or block 314 along the shaft 304 and way bar 300, the direction of movement depending upon the direction of rotation of the hand wheel 326 and the nut 322.

Means in addition to the way bar 300 is provided for guiding the carriage 312. Disposed lengthwise and parallel with the way bar 300 is a guide track or member 330 of L-shaped cross section, as shown in FIG. 3, connected at one end to the frame member 29 and at its other end with the member 299. The carriage block 314 is equipped with a member 332 secured to the block 314 by screws 334. The member 332 has a threaded opening to receive a threaded stud 336 on which is journally supported a roller 337, the stud being locked to the member 332 by a nut 338.

Mounted upon and secured to the L-shaped member 330 is a spacer bar or member 340 and a plate 342 secured to the bar 340. The bar 340 is of a thickness to provide running clearance for the roller 337 between the surface 331 of member 330 and the plate 342. The roller 337 traverses the space between the guide track 330 and the plate 342 whereby the carriage 312 is accurately guided in its longitudinal movements by the way bar 300 and the L-shaped guide track 330.

Means is provided for locking the carriage 312 in adjusted positions to which the carriage is moved along the way bar 300 and track 330. Referring particularly to FIGS. 3, 4 and 8, the block 314 is provided with a bore 344 normal to the axis of the way bar 300. The plate 314 is fashioned with a slot 346 which accommodates a locking or manipulating member 347, as shown in FIGS. 4 and 8. Disposed in the bore 344 at each side of the handle 347 is a segmentally shaped spacer or member 348. The spacer members 348, the handle 347 and the plate 314 are formed with aligned openings in which is disposed a dowel 350 which forms a pivot means for the handle 347.

Also slidably disposed in the bore 344 is a clamp disc 352 having an arcuate surface of a radius corresponding to the radius of the way bar 300 and is disposed with the curved portion contiguous with the peripheral curvature of the way bar 300. A cam 354 integral with the locking member or handle 347 is of a contour such that when the locking member 347 is in the position shown in FIG. 8, the cam surface or contour 354 engages the disc member 352 and clamps the latter into snug engagement with the shaft or way bar 300 to thereby lock the carriage 312 against movement.

To release the carriage 312 the handle 347 of the cam member 354 is moved in a counterclockwise direction, as viewed in FIG. 8, about the axis of the dowel pin 350 thereby releasing clamping pressure on the member 352 to enable slidable movement of the carriage along the way bar 300 and the threaded shaft 304.

The carriage 312 embodies means hereinafter described for clamping a tube or pipe 40 to the carriage so that upon lengthwise movement of the carriage the tube or pipe 40 will be advanced to a position at which a bend is to be formed in the pipe or tube 40. As distances vary between successive bends, the carriage 312 is adjustable to position the pipe whereby the distance between successive bends is provided by accurate positioning of the carriage 312.

Means is provided for accurately positioning the carriage 312 so that a succeeding bend is formed in the tube at a proper distance from the preceding bend. The indexing means for determining the desired position of the carriage comprises a scale 356 graduated in suitable units of length cooperating with openings fashioned in the nut 322, the openings being successively brought into registration with indicia or graduations on the scale 356 in adjusting the carriage to different positions.

The pitch of the square cross-section threads on the shaft 324 is selected as one unit of linear measurement, being the distance between two numerals or graduations on the scale 356, for the carriage position, and the relative position of rotation of the nut 322 determines the subunits of measurement for each pitch distance of successive spiral threads on the shaft 304. For example, the pitch of the spiral threads on the shaft 304 may, be one-quarter of an inch. For purposes of encoding various positions of the carriage with respect to the shaft 304, the numerals on the scale 356 in a recess 358 represent increments of one-quarter of an inch.

The scale 356 is preferably fashioned as a lengthwise strip of metal or plastic secured at one end in the recess 358 by a pin 359 and at its other end by a pin 360, the pins being press fitted into openings in the threaded shaft 304. Where the pitch of the threads on shaft 304 is one-quarter of an inch, one complete rotation of the nut 322 and hand wheel 326 will move the carriage 312 lengthwise a distance of one-quarter of an inch. In order to provide for accurately positioning the carriage 312, the nut 322 is fashioned with eight facets or lands 362 providing an octagonal configuration as illustrated particularly in FIGS. 10 and 11.

Drilled radially of the axis of the nut through each facet or land 362 is an opening 363. As there are eight facets or lands illustrated in FIG. 11, there are eight openings designated successively A through H as shown in FIG. 12. With eight equally spaced radial openings in the nut 322, a transverse plane through each opening is spaced from a transverse plane through the adjacent opening a distance of one thirty-second of an inch lengthwise of the axis of the nut, the openings being arranged in echelon lengthwise of the axis of the nut as shown in expanded view, FIG. 12.

Upon rotation of the nut 322 by manipulating the hand wheel 326, the openings A through H may be selectively moved into registration with the encoding numerals on the scale 356 to add increments of one thirty-second of an inch to the lengthwise distance indicated by the adjacent numeral visible through the openings in the nut.

Fashioned on the nut 322 adjacent each of the openings is a recess 364, the floor or planar surface of each recess being provided with a letter or encoding character which may be coined or impressed in the floor of each recess. In the embodiment illustrated each successive recess 364 bears the successive letters A through H in the manner shown in FIGS. 10 and 12.

Through this arrangement an encoding system of numerals or other suitable characters associated with the sight openings 363 in the nut 322 provides a simplified system of ascertaining or predetermining relative lengthwise positions of the carriage 312 along the stationary shaft 304. Assuming, for example, that the carriage is to be moved a distance of 4 5/32 inch from its base or zero position wherein the end of the carriage 312 engages the abutment plate 296.

In arriving at this position of the carriage, the nut 322 is rotated in the proper direction to move the carriage 312 in a right-hand direction, as viewed in FIG. 8, until the sight opening designated A registers with the numeral 16 on the scale 356. This position of registration indicates that the carriage has been moved from the abutment plate 296 a distance of 4 inches, each numeral indicating a distance of one-quarter of an inch. The operator then further rotates the nut 322 through a partial rotation to bring the sight opening F into registration with the scale 356.

This added partial rotation of the nut advances the carriage 312 an additional five thirty-seconds of an inch so that the total adjusting movement of the carriage is 4 5/32 inches.

In the position of the nut 322 with respect to the scale 356, illustrated in FIG. 8, the sight opening B is in registration with the scale 356, the numeral 11 on the scale being in partial registration with the sight opening B. With the pitch of the thread on shaft 304 being one-quarter of an inch for each numeral on the scale, the carriage 314 is disposed at a distance of 2 25/32 inches from the abutment 296.

It is to be understood that the pitch of the spiral thread on the shaft 304 may be of a different value and the sight openings A through H would be spaced at greater or lesser distances in echelon pattern. For example, if the pitch of the thread on the shaft 304 is one-eighth inch per revolution, the sight openings would be spaced longitudinally of one another a distance of one sixty-fourth of an inch. Hence, each ⅛ revolution of the nut 322 would move the carriage 312 through a lengthwise distance of one sixty-fourth of an inch.

The carriage 312 is equipped or provided with means for rotating the tube or tubular stock 40 to determine the radial angularity of a bend with respect to the radial angularity of the preceding bend and to clamp the tube or tubular stock so that the same is movable with the carriage whereby movement of the carriage toward the abutment 296 advances the tube or tubular stock 40 in a position to form a succeeding bend therein.

The plate 314 of the carriage is provided with bores into which are press fitted upwardly extending struts or rods 368. The rods are fixedly secured in the bores by pins 369.

A tube clamp supporting plate or member 370 is provided with bores receiving the rods 368, the bores in member 370 being of a diameter to snugly, yet slidably, accommodate the rods. The upper ends of the rods 368 are fashioned with tenons 372 of reduced diameter, the tenons extending through openings in a spacer plate 373, the tenons being threaded to accommodate securing nuts 374 for securing the plate or member 373 in fixed relation with the rods 368. The rods 368 provide means or ways for guiding slidable movements of the plate 370.

Means is provided for adjusting the tube clamp support plate 370 with respect to the carriage plate 314 whereby tubular stock 40 of different diameters may be accommodated by the clamp means hereinafter described. With particular reference to FIG. 3, the plate 314 is fashioned with an unthreaded bore 376 of a diameter to provide clearance for a threaded portion 378 of a member 379. The upper end region of the member 379 is provided with a tenon 380, shown in FIG. 4, extending into a bore 381 in the plate 370. The plate 370 and the tenon 380 have aligned openings into which a pin 382 is press fitted to secure the member 379 to the member 370 to prevent rotation of the member 379.

Coaxial with the bore 376 in the plate 314 is a counterbore accommodating a bushing 383 pressed into the counterbore. Mounted on the threaded portion 378 is a circular member 384 having a hollow hub portion 385 extending into a counterbore in the bushing 383 and bottoming in the counterbore, the interior of the hub being threaded for threaded engagement with the threaded portion 378. Also mounted on the threaded portion 378 is a locking nut 386.

By releasing the locking nut 386 and rotating the circular member or nut 384, the member 384 may be threaded in either direction to raise or lower the plate 370 dependent upon the direction of rotation of the nut or member 384. The nut 384 may then be locked against further rotation by the lock nut 386.

The plate 370 supports means for clamping the tube or tubular stock 40 against longitudinal movement relative to the carriage 312 and means for controlably rotating the tube or tubular stock to predetermine the direction of angularity of the succeeding bend to be formed. The plate 370 is fashioned with a circular bore in which is mounted an annular member 388 which is rotatable in the bore in the plate 370. The member 388 is fashioned with a circular recess accommodating an annular end region 390 of a rotatable clamp-actuating member 392, the latter being in the form of a bushing-like configuration having a circular grip or hand wheel portion 394.

The member 388 is fashioned with integral segmentally shaped portions 396, each fashioned with a rectilinear recess 397, the recesses 397 being in parallelism and providing guide means or ways accommodating slidable tube-clamping jaws or shoes 400, particularly shown in FIGS. 3 through 6. With reference to FIGS. 5 and 6, each of the clamping jaws or shoes 400 is fashioned with parallel side surfaces 402 slidably fitting in the recesses 397 shown in broken lines in FIG. 3, the shoes being held in the recesses by segment-shaped plates 398 secured to the portions 396 by screws 399.

Each of the shoes 400 is provided with angularly disposed surfaces 404, portions of each surface 404 being provided with askew tube-gripping serrations 405, shown in FIG. 6. The serrations 405 provide sharp ridges for engagement with the tube or tubular stock 40 when the shoes 400 are in clamping engagement with the tube. Means is provided for reciprocating the shoes 400 along the recesses 397. Formed in each of the shoes 400 is a cam slot 407, the axes of the curved surfaces of the cam slots being eccentric with respect to the axis of the rotatable actuating member 392.

Disposed in each of the cam slots is a cam follower or roller 409, each roller being rotatably supported upon a pin 411, each pin having a threaded portion threaded into a bore in the member 392 as shown in FIG. 4.

Thus, when the actuating member 392 is rotated by manually rotating the wheel portion 394 thereof, the rollers 409 traverse the eccentrically arranged cam slots 407 in the clamping shoes 400, this action effecting reciprocation of the clamping shoes 400 toward or away from each other depending upon the direction of rotation of the actuating member 392.

Thus the tube or tubular stock 40 shown in FIG. 1, extending through the clamping jaws 400 shown in FIG. 3, may be clamped or released by manipulation of the rotatable jaw actuator 392. Through the provision of the cam slots 407, the jaws or shoes 400 may be reciprocated through sufficient distances to clamp tubes or tubular stock of different diameters in fixed relation with the actuating member 392. A strut 391 is connected with the spacer plate 373 and the carriage block 314 to provide added support for the plate 373.

Means is provided for rotating member 388 and the clamping jaws 400 to rotate the tube or tubular stock to the desired angle at which the next succeeding bend is to be formed. A protractor or semicylindrically shaped member 414 is fixedly secured to the plate 370 by means of screws 416, shown in broken lines in FIG. 3, and is movable with the plate. The semicircular-shaped member 414 is fashioned with a circularly shaped recess 415 in which is disposed a scale 418 bearing degree graduations 419, the scale illustrated being graduated for 180°. The scale 418 may be a strip of plastic, metal or other material imbedded in the recess 415 and cemented therein.

A rotatable arm or member 420 is provided which cooperates with the protractor-like member 414 and the rotatable member 388 journaled in a bore in the plate 370. The rotatable jaw actuating member 392 is fashioned with a peripheral recess 422 in which is disposed two semiannularly shaped members 424 and 425, the space or split 426 between the ends of the semiannular members being indicated by broken lines in FIG. 4. The semiannular members 424 and 425 are secured to the rotatable member 388 by means of a plurality of screws 428, two of which are illustrated in FIG. 4.

The two semiannularly shaped members 424 and 425 together form a cylindrical bearing surface which is contiguous with the recess 422 in the member 392 whereby the members 424 and 425 are journaled for rotation on the member 392. The arm 420 is secured to the semiannular member 425 by three of the screws 428. The arm 420 is provided with an extension or portion 430 secured to the arm by screws 431. The extension 430 is fashioned with a recess defined by an edge 433, the latter serving as an index surface preferably at the central longitudinal axis of the arm 420, the edge or edge surface 433 being arranged for cooperation with the degree indicia or graduations 419 on the scale 418 carried by the protractor member 414.

Means is provided for readily securing or locking the extension 430 and the arm 420 in adjusted positions relative to the protractor member 414. The upper end region of the extension 430 is fashioned with two shallow partial spherically shaped recesses accommodating spherical metal members or balls 435.

Disposed adjacent to and contiguous with the end region of the extension 430 is a plate or member 436, the plate having detents or recesses to accommodate the balls 435, the balls providing a fulcrum means to provide for slight rocking or tilting movement of the plate 436 with respect to the extension 430 of the arm 420.

The upper portion of the plate 436 is provided with a threaded bore accommodating a threaded member or screw 437, the screw 437 extending through an unthreaded bore 438 in the extension 430. An expansive coil spring 439 is disposed between the head of the screw 437 and the extension 430. A portion 440 of member 436 overlaps and is contiguous with the peripheral arcuate region of the protractor member 414. The locking plate or member 436 is provided with a threaded bore accommodating a threaded member 442 which extends through an unthreaded bore 443 in the arm extension 430. The threaded member 442 is equipped with a plastic manipulating knob 444.

By releasing the locking screw 442 through manipulating of the knob 444, the spring 439 swings the plate 436 about the fulcrum means provided by the balls 435 to release the arm 420 and its extension 430 from locking engagement with the protractor member 414. This enables rotation of the arm 420 with respect to the protractor member 414 whereby member 388 is rotated together with the tube or tubular stock 40 clamped by the shoes or jaws 400 and the member 392 to a desired angular position. The method steps performed by the arrangement shown in FIGS. 3 through 6 will be hereinafter described.

As shown in FIG. 3, an abutment in the form of a U-shaped block 446 is secured to an end region of the protractor member 414 which limits the movement of the arm 420 and its extension 430 in one direction with respect to the protractor. A similar abutment (not shown) is secured to the opposite end region of the protractor-like member to limit movement of the arm 420 and extension 430 in the other direction.

The method and apparatus are particularly adaptable for impressing successive bends in thin-walled metal pipe, tubing or tubular stock for use as exhaust pipe or tail pipe for the exhaust gas system of an automotive engine. Where the pipe or tubing is for fashioning exhaust pipes for exhaust gas systems for various types of internal combustion engines, different diameters of tubular stock may be used as, for example, 1¾ inch diameter, 2 inch diameter, 2¼ inch diameter and other sizes where required.

As shown in FIG. 1, a length of thin-walled pipe, tubing or tubular stock 40 is normally rectilinear as shown at the left-hand side of the bending apparatus, and for purposes of illustration, the portion of the pipe at the right-hand side of the apparatus having been formed into bends identified at 190, 451 and 452. Tubular stock of any length may be used and bends of various depths and angularities may be formed with different distances between successive bends.

Figure 28:
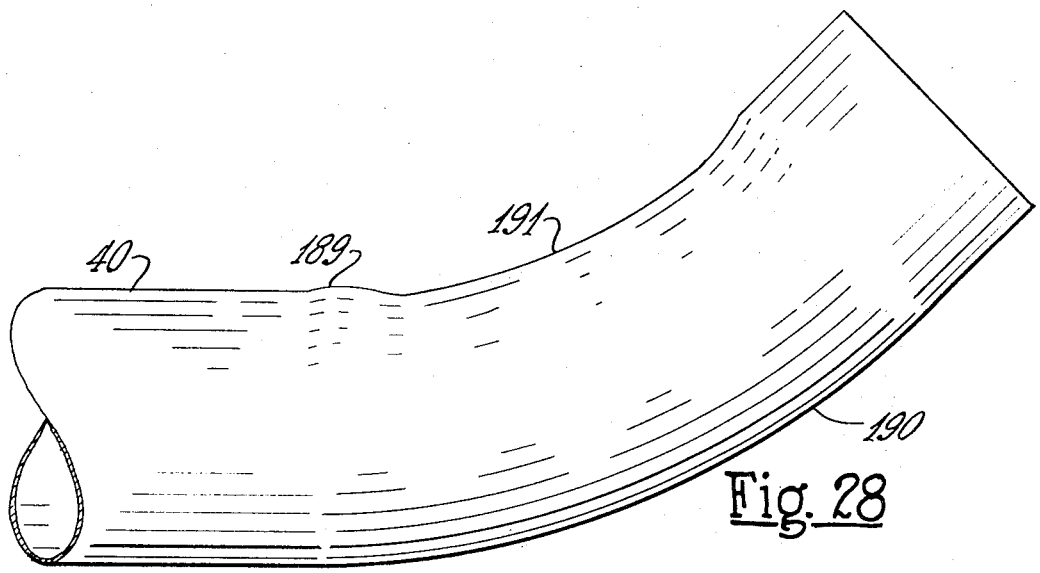
FIG. 28 is an elevational view of a portion of a tube illustrating a completed bend.

The portion of the tube 40 shown in FIG. 28 illustrates at 189 the lateral displacement, distortion or cold flow of the metal at a localized region of the tube effected by initial impact and engagement of the bending shoe 162 with the tube which forces the metal, shown at 189, into the space 185, shown in FIG. 22.

Thus, the metal which forms the ridge 189 at this localized region is caused to move or flow concomitantly with the start of a bending operation, and the action of the bending shoe continuing movement or flow of the metal without interruption during rotation of the bending shoe. During a bending operation, the rectilinear portion of the tube 40 at the left of the displaced or distorted metal at the ridge 189 is tightly clamped by the clamping dies or jaws 118 and 125.

From FIG. 28 it will be seen that the curved surface 191 of the bend 190 is of smooth contour without any wrinkles. The bending of the thin walled tube is accomplished without the use of a mandrel with only a very small reduction in cross-sectional area of the pipe at the region of the bend 190 as compared with the cross-sectional area of the rectilinear portion of the pipe 40.

FIG. 29 is a schematic diagram of the hydraulic lines, hydraulic actuators, sequence valves and other operating components of the hydraulic system for effecting tube-clamping and tube-bending operations. The oil reservoir or oil supply tank 27 is illustrated schematically at several points in FIG. 29 to simplify the diagram.

The hydraulic system includes the oil supply tank 27 and the oil pump 34, the latter being driven by an electrically energizable motor 32. A pressure gauge and metering valve construction of conventional construction 453 may be intercalated with the outlet pipe or oil line 38 from the pump 34.

A conventional Vickers solenoid-operated four-way valve 455 is connected with the metering valve 453 by a fluid line 454. A fluid line 457 is connected with the four-way valve 455 and with a first sequence valve 458. A fluid line 84 is connected with the sequence valve 458 and with the lower end head 82 of the cylinder 80 of the actuator 78 which actuates the bending shoe 162 and the auxiliary shoe 180. The fluid line 84 is connected by a fluid line 460 with a second sequence valve 462 and with a check valve 464.

The check valve 464 is connected by fluid lines 465 and 198 with the lower end head 197 of the cylinder 196 of the cushion or reaction means 194. The other end head 199 of the cylinder 196 has a fluid return line 200 to the oil supply tank 27. A third sequence valve 467 controls hydraulic reaction pressure on the piston 205 in the cylinder 196 which relieves the pressure when the pressure exceeds a predetermined value whereby the oil flows out of the cylinder 196 to the oil supply tank 27 through fluid conveying lines 469 and 470.

The fluid pressure line 472, connected with the fluid line 465, has an adjustable pressure relief valve 473 which is set to normally relieve the pressure when the pressure reaches a predetermined value in the fluid line 472.

A check valve 475 is connected between the fluid conveying line 472 and a fluid conveying line 477. Fluid under pressure is supplied to a fourth sequence valve 479 and through a fluid conveying line 480 and from the sequence valve 479 through a fluid line 481 to the lower end head 135 of the cylinder 137 of the tube clamp actuator 127, the fluid being introduced beneath the piston 140 in the cylinder 137.

The upper end head 138 of the cylinder 137 has an outlet line 482 for returning fluid from the upper end head 138 of the cylinder 137 to the oil supply tank 27. The piston 140 in the cylinder 137 of the clamp actuator 127 is released by a flow of oil through the fluid conveying line 484 through the sequence valve 479 into the upper cylinder head 138. The operation of the hydraulically actuated mechanisms will be hereinafter explained in describing the operation of clamping a pipe and forming a bend in the pipe.

Figure 30:
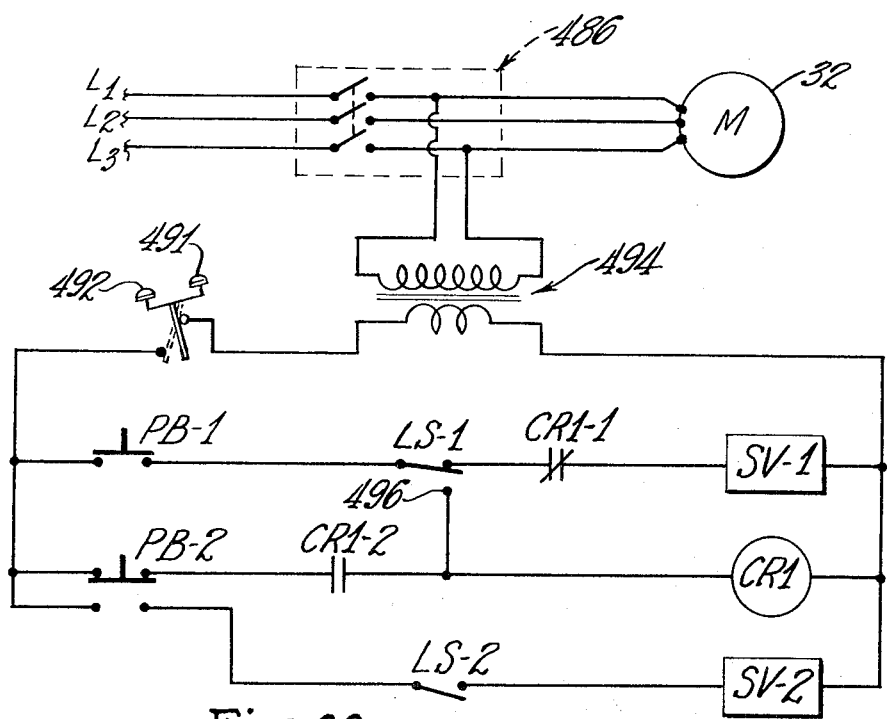
FIG. 30 is a schematic electric circuit diagram of the controls for the hydraulic actuators of the apparatus.

The electrical control circuit for the actuating components is illustrated in FIG. 30. The circuit includes a conventional starter switch 486 enclosed in a cabinet 487, shown in FIG. 2. The electrically energizable components for initiating movement of the hydraulic actuators are controlled by push button switches PB–1 and PB–2. The starter is connected with starter supply conductors L1, L2 and L3.

A push button 491, shown in FIG. 1, is interconnected by means (not shown) with the switch 486 for operating the switch to establish a "run" position. The push button 492 is an emergency "stop" button which opens the switch 486 previously closed by the button 491, the latter interrupting current supply to the electrically energizable components controlling the operation of the hydraulic actuators.

The oil pump driving motor 32 is connected with and energized through the switch 486. A transformer 494, contained in the housing 487, is supplied with current through the switch 486, the transformer 494 reducing the voltage for the control circuits containing the electrically energizable components for controlling the hydraulic actuators. The push button switch PB–1 is for initiating the operation of a bend. LS–1 is a limit switch contained in the switch housing 288, shown in FIGS. 18 and 19, which limits the depth of a bend.

SV–1 is a first operative position of the solenoid operated four-way valve 455 when the solenoid S-1 of the valve is energized. SV–2 is the operative position of the four-way valve 455 when the second solenoid S–2 is energized. PB–2 is a push button switch movable to a position to energize the solenoid S–2 to effect return movement of the bending shoe 162 to its initial position.

CR1 is a control relay, the relay having contacts CRL–1 and CR1–2, the purpose and function of the relay being hereinafter explained in connection with the operation of the apparatus.

LS–2 indicates a limit switch, shown in FIGS. 1, 13 and 14, which is actuated by the movable clamping die 125 in retracted position to de-energize the solenoid S–2 of the 4–way valve 455, shown in FIG. 29, thereby to condition the hydraulic system for a succeeding bending operation.

The operation of the apparatus and the steps in the method of clamping the tube 40, forming a bend in the tube and the steps of advancing and positioning the tube are as follows: Assuming that the apparatus is in a position to receive and accommodate a rectilinear length of tube or tubular stock 40, the operative components of the bending apparatus are in the following positions: The bending shoe or wing die 162 and the auxiliary bending shoe or wing die 188, if used, are at their lowermost positions, shown in FIGS. 13, 16 and 21, that is, their most remote position from the stationary bending die or matrix 107. The movable clamping die 125 is in its lowermost position remote from the stationary clamping die 118, and the tube or pipe 40 extends through the movable tube gripping members or jaws 400 supported by the block 370 of the carriage 312 and is in unclamped and ungripped position.

The tube is manually advanced so that the tube extends beyond the region of the bending die 162 and the auxiliary die 180 an amount dependent upon the length of unbent tube to be provided in advance of the first bend. The switch 486 is closed by the operator depressing the push button 491, energizing the motor 32, the motor driving the hydraulic pump 34 to establish hydraulic pressure for operating the hydraulic actuators.

The closing of the switch 486 by the push button 491 activates the energizing circuit for the components controlling the hydraulic actuators. The operator then moves the carriage 312 by rotating the nut 326 in the proper direction to bring the plate or block 314 of the carriage into abutting relation with the abutment 296. The operator rotates the hand wheel 394, shown in FIGS. 1 and 4, to rotate the sleeve 392, causing the rollers or cam followers 409 to traverse the cam slots 407 moving the pipe gripping jaws or members 400 into gripping engagement with the exterior surface of the pipe or tube 40. The carriage 312 is locked in engagement with the abutment 296 by manipulating the handle member 347, shown in FIG. 8, to rotate the cam 354 in a counterclockwise direction biasing the clamp disc 352 into locking engagement with the way or bar 300.

The arm 420, cooperating with the protractor member or sector 414 is released by manipulating the knob 444 and is then moved to a zero degree position and the locking screw 442 again manipulated by the knob 444 to securely lock the clamping plate 436 to the peripheral region of the protractor member or sector 414. This operation locks the tube or pipe 40 against rotation. The operator then manipulates the mechanism to determine the extent of angularity or depth of bend to be formed in the tube or pipe, this mechanism being particularly shown in FIGS. 18 through 20.

This manipulation includes releasing the slidable element or angularity indexing plate 270 by rotating the knob 274 to release the locking screw 272 and then sliding the plate 270 along the bar 258 to bring the index edge 281 in registration with the graduation 252 on the scale 250 corresponding to or indicating the angle of bend to be formed. As shown in FIG. 19, the slide plate 270 is in a position with the index edge 281 in registration with the graduation indicating a bend to be formed of an angle of 45°. The operator manipulates the knob 274 to draw up the locking screw 272 thereby securing the plate 270 to the way or bar 258, the latter carrying the longitudinally movable rack bar 256, the teeth of which are in enmeshment with the teeth 236 of the sector 230.

The apparatus is now in condition to effect a bend in the tube 40. The operator then depresses the push button switch PB–1 completing a circuit energizing solenoid S–1 of the four-way valve 455, shown schematically in FIG. 29, to effect flow of oil under pressure from lines 38 and 454 to line 480. Thus oil under pressure from the pump 34 flows through line 480, the sequence valve 455 and line 480 to the lower end head 135 of the cylinder 137 of the clamp actuator 127. Fluid pressure moves the piston 140 upwardly actuating the clamping shoe 125 to securely clamp the tube 40 between the clamping shoes or members 118 and 125.

When the clamping shoe 125 is thus moved to tube-clamping position, the clamping cylinder cannot accommodate more oil below the piston 140 and hence the oil pressure rises in the cylinder 137 beneath the piston 140 and the sequence valve 458 is piloted at the pressure value for which the sequence valve 458 is set. The sequence valve 458 then directs oil under pressure through the oil line 84 into the lower head 82 of the cylinder 80 beneath the piston 86 of the hydraulic actuator 78 for the bending shoe 162 and slide 58. At the same time oil flows through the line 460 through the sequence valve 462 past the check valve 464 and through the lines 465 and 198 into the cylinder 196 of the hydraulic reaction or cushioning means 194.

The piston 86 moves upwardly in the cylinder 80 moving the slide or carriage 58 upwardly thus engaging the movable bending die or shoe 162 with the tube 40 in the position illustrated in FIG. 22. The engagement of the bending die 162 with the tube 40 under fluid pressure acting upwardly on the piston in the cylinder 80 effects initial cold flow, movement or displacement of the metal of the tube into the space or pocket 185, shown in FIG. 22, the metal being bulged or forced into the space or pocket to thus form the raised region 189 shown in FIGS. 22 and 28.

The piston 86, under the influence of fluid pressure, continues upward movement of the slide or slidable carriage 58 causing rotation or wiping of the bending die or wing die 162 around the stationary die or matrix 107 to effect a bend 190 in the tube 40, shown in FIG. 23, the action of the wiping and bending die 162 around the stationary die 107 concomitantly rotating the crankshaft 164 as it moves upwardly with the slide 58.

During upward movement of the piston 86, the oil above the piston in the cylinder 60 flows through the fluid lines 85 and 477 into the oil supply tank 27.

The relative rotation of the shaft 164 causes rotation of the arm 212, shown in FIG. 17, which produces a mechanical force driving the piston 205 in a return or downward direction, as viewed in FIG. 17, in the cylinder 196, forcing oil from the cylinder through the line 198 and the relief valve 473 to the oil supply tank 27. The relief valve 473 is adjusted or set to open at a predetermined pressure in the reaction or cushion cylinder 196, the relief pressure setting being substantially less than the force acting on the piston 86 in forming a bend in the tube.

As oil is forced from the lower end of the reaction cylinder 196 by the downward movement of the piston 205, oil is sucked from the oil supply 20 through the fluid line 200 into the upper end head 199 of the cylinder, thus avoiding the establishment of a vacuum above the piston 205. The greater force acting on the piston 86 is sufficient to effect a bending of the tube 40 and, as the bending action progresses, the hydraulic pressure acting on the piston 86 progressively increases as the stresses resisting bending increase.

When the increasing pressure acting on the piston 86 approaches the pressure setting of the sequence valve 458, sequence valve 462 is de-piloted but oil flow continues.

The pressure increase continues until sequence valve 467 is piloted. Pressure on the piston 140 of the clamp cylinder 137 becomes equal to the setting of the sequence valve 458 or to the pressure on the piston 86, whichever is the greatest.

If the pressure on the piston 86 exceeds the pressure setting of the sequence valve 467, this sequence valve permits flow of oil from the reaction cylinder 196 through the fluid line 470 into the oil supply tank 20 bypassing the relief valve 473, and the pressure then existent on the opposite side of the piston 205 of the reaction means 194 is greatly reduced as the bend being formed nears completion. At the completion of a bend, shown in FIG. 23, the movable tube clamp 125 remains in tube clamping position and the bending die 162 is in bend-completion position.

The operator holds the switch PB-1 in contact-engaging or closed position throughout a tube bending operation. During the formation of a bend, the slide 58 is moving upwardly and the shaft 164 is rotating as the bending shoe 162 is rotated or wiped around the matrix 107. The toothed sector 230, shown in FIGS. 18 and 20, being secured to the shaft 164, is rotated with the shaft in a clockwise direction as viewed in FIG. 18. The teeth 236 of the sector 230 are enmeshed with the teeth 262 of the rack 256.

Hence, rotation of the sector 230 in a clockwise direction moves the rack 256 in a rectilinear direction downwardly as viewed in FIG. 18 carrying with it the way bar 258, the indexing plate 270 and the index member or extension 278.

As the index member 278, carried by the plate 270, is moving downwardly, the limit switch LS-1 contained within the housing 288, shown in FIGS. 18 and 19, is moving upwardly with the slide or carriage 58 as the member 242 is carried by the slide. When the cam surface 280 of the index member 278 is engaged with the roller 292 of the limit switch member 291, the limit switch LS-1 is moved from a closed position, shown in FIG. 30 into engagement with a contact 496, shown in the circuit diagram, FIG. 30.

Actuation of the limit switch LS-1 opens the normally closed contacts of the relay CR1-1 and closes the normally open contacts CR1-2. This action de-energizes the solenoid S-1 of the four-way valve 455 so that the valve is centered, directing oil flow into the supply tank 27. At the completion of a bend the various components are in the respective positions shown in FIG. 23, the bending shoe 162 remains in the position it occupies at the end of a bending cycle, the tube clamp 125 remains in tube-clamping position and the carriage 312 is engaged with the abutment 296.

The following operations are performed by the operator in repositioning the tube or pipe 40 in a position for the formation of a succeeding bend. The operator manipulates the hand wheel 394, shown in FIG. 4, to rotate the member 392 in a clockwise direction, as viewed in FIG. 3, to release the tube gripping shoes 400 from engagement with the tube 40, rotation of member 392 causing the rollers 409 to traverse the cam slots 407 in the gripping shoes 400 to move the shoes 400 in opposite directions, thereby releasing grip of the shoes on the pipe.

The operator then manipulates the knob 444 which rotates threaded member 442 and releases the plate 436 from clamping engagement with the stationary protractor or semicircular plate 414 and swings the arm 420 to bring the index edge 433 into registry with the zero line of the graduations on the scale 418 or with the 180° line on the scale depending upon the direction of angularity of the bend to be formed relative to the angularity of the bend that has just been completed.

This adjustment of the arm 420 is not required in connection with the formation of the first bend in the tube or pipe because no relative rotation of the tube is required until after the first bend is completed. After the index edge 433 has been brought into registry with the zero line on the scale 418 or with the 180° line, the operator then manipulates the knob 444 to lock the arm 420 to the protractor or semicircular plate 414, the tube gripping shoes 400 being out of gripping engagement with the tube.

The operator then unlocks the carriage 312 from the bar 300 by moving the locking member 347 in a counterclockwise direction as viewed in FIG. 8, releasing clamping pressure of the disc 352 on the bar 300. The carriage 312 is now in condition to be moved in a left-hand direction, as viewed in FIGS. 4 and 23 which is a right-hand direction, as viewed in FIGS. 7 and 8. The operator rotates the hand wheel 326 and nut 322 in a direction to move the carriage 312 in a right-hand direction, as viewed in FIGS. 7 and 8, by cooperation of the nut with the threaded shaft or member 304.

The operator continues rotation of the nut 322 until the rectilinear dimension between the preceding bend and the bend to be formed is indicated by an encoding numeral on the scale 356 in registration with one of the radial openings A through H in the nut 322, the openings being particularly shown in FIGS. 10 and 11. Thus, if the distance between successive numerals on the scale 356 is one-quarter of an inch, the rotation of the nut 322 through one-eighth of a revolution indicates a linear distance of carriage movement of one thirty-second of an inch.

If the rectilinear distance the pipe is to be moved for a succeeding bend is 4⅛ inches, the nut 322 is rotated until the opening A is in registration with the numeral 16 on the scale 356. The nut is then additionally rotated through one-half revolution to bring the opening E in registration with the numeral 16, the additional one-half revolution of the nut 322 advancing the pipe an additional one-eighth inch so that the total distance that the carriage has been moved from its initial position is 4⅛ inches.

In this position of the carriage 312, the locking member 347 is moved into locking position, as shown in FIG. 8, to secure the carriage against further movement relative to the tube 40. The operator then manipulates the hand wheel 394 to bring the locking shoes or jaws 400 into gripping or clamping engagement with the pipe 40.

After the pipe has been gripped by the jaws 400, the operator depresses the push button PB-2, this action completing an energizing circuit through the solenoid S-2 of the four-way valve 455, shown in FIG. 29, this circuit being energized so long as the operator manually holds the switch PB-2 in contact closing position or until the limit switch LS-2 is actuated.

Oil under pressure from the pump 34 is now directed by the four-way valve 455 through lines 477 and 85 into the cylinder 80 above the piston 86 to move the piston downwardly in the cylinder 80 which moves the slide 58 downwardly effecting reverse rotation of the shaft 164 and retracting the bending die or shoe 162 to the position shown in FIG. 25 out of engagement with the tube 40.

At the same time oil under pressure flows through the line 477 through the check valve 475 and lines 465 and 198 into the opposite end of the reaction cylinder 196 which moves the piston 205 upwardly, as viewed in FIGS. 17 and 29, which forces the oil in the cylinder 196 at the opposite side of the piston through the line 200 into the oil supply or tank 27. As the piston 86 is retracted or moved downwardly to retract the bending shoe 162, the oil beneath the piston 86 in cylinder 80 flows through the line 84, sequence valve 458 and fluid line 457 through the four-way valve 455 to the oil supply 27.

When the cylinder 80 is filled with oil above the piston 86, the piston reaches the bottom of its stroke and pressure builds up in the fluid line 85, piloting the sequence valve 479 whereby oil flows through the line 482 to the upper end of the clamping cylinder 137, exerting downward pressure upon the piston 140 whereby the oil below the piston is returned through the sequence valve 479 to the oil supply 27.

Through this action the movable tube clamp 125 is withdrawn from clamping engagement with the tube or pipe 40 as shown in FIG. 25. The clamp 125 is retracted through a distance until the limit switch LS-2, shown in FIGS. 13 and 30, is engaged by member 147, shown in FIG. 13, carried by the member 145 movable with the clamping die 125, the limit switch automatically interrupting the circuit through the solenoid S-2, shown in FIG. 30, centering the valve 455 to interrupt flow of oil under pressure.

While both the bending shoe 162 and the clamping die 125 are thus disengaged from the tube 40, the tube is locked against movement by the clamp shoes 400 mounted on the carriage 312. With the tube 40 locked to the carriage 312, the locking means 347 is released and the carriage 312, carrying the protractor 414, the arm 420 and the tube-clamping shoes 400, is advanced by rotating the hand wheel 326 and nut 322 in the proper direction until the carriage block 314 abuts the member 296 carried by the frame 29, this position of the carriage being illustrated in FIG. 26.

As the tube 40 is locked to the carriage by the gripping shoes 400, this movement of the carriage 312 advances the tube 40 to the position shown in FIG. 26 but without any relative rotation of the tube having taken place. With the tube 40 and carriage 312 in the position shown in FIG. 26, the operator manipulates the knob 444 to release the clamp member 40 carried by the lever 420 from clamping engagement with the protractor 414.

The operator then rotates the arm 420 and the tube 40, which is clamped in fixed relation with the arm, through an angular distance equal to the angular distance for the next bend to be formed with respect to the preceding bend. After movement of the arm 420 to the proper angle desired for a bend, the arm 420 is locked to the protractor by manipulating the knob 444 to engage the clamp 440 with the protractor 414. This new position of the tube 40 is illustrated in FIG. 27.

Through the operations described, the tube 40 is repositioned as shown in FIG. 27, being advanced through a linear distance at which a succeeding bend is to be formed with the tube rotated to provide the desired angularity for the bend to be formed with respect to the bend just completed. The operator then manipulates the locking member 347, shown in FIG. 8, to lock the carriage in engagement with the abutment or member 296 preparatory to forming a bend. The tube 40 is now in a position for the operator to again close the switch PB-1 to initiate the above described sequence of operations in forming the succeeding bend.

The series of method steps or operations above described is carried out for forming each bend until all of the bends desired in the pipe 40 have been formed. An operator, having the encoded specifications of the angularities of the bends, the depth or extent at which each bend is to be formed and the distance between successive bends, is enabled to manipulate the apparatus to accurately form a tube or pipe to the desired shape or configuration.

The configuration of the pipe may be made to conform accurately to the encoded specifications because the tube is never released at any time during the formation of the several bends but is always under positive control whenever the tube is advanced or rotated preparatory to a bending operation.

The hydraulic control components are mounted upon a panel associated with the cabinet 487, shown in FIG. 1, the components including the four-way valve 455, the relief valve 473 and the sequence valves 458, 462, 467 and 479 and the check valves. The method and arrangement facilitates the formation of a bend in a tube, tubular stock or pipe at comparatively low hydraulic pressures.

The following are exemplary of hydraulic pressures that may be satisfactorily employed in forming bends. For example, the cross sectional area of the piston 140 in the clamp cylinder 137 may be about 5 square inches and the sequence valve 479 may be set to release at about 200 pounds pressure per square inch. Thus, the resultant force actuating the movable clamping die section 125 is about 1,000 pounds.

The area of the piston 86 in the cylinder 80 of the bending shoe actuator 78 may be about 12½ square inches. The sequence valve 458 may be set to release at about 900 pounds pressure per square inch. Thus, the resultant force acting on the piston 86 in performing a bend is about 11,000 pounds. The area of the piston 205 in the reaction or cushioning cylinder 196 may be about 3 square inches and the relief valve 473 may be set to release at a pressure of about 800 pounds per square inch. Thus the reaction force on the piston 205 is about 2,400 pounds.

These exemplary pressures and forces have been found satisfactory in bending a thin-walled tubular metal stock or tubing for exhaust pipes and tail pipes in the range of 1½ inches to 2½ inches in diameter. It is to be understood that the sequence valves may be set to release at lower or higher pressures and the diameters of the cylinders of the hydraulic actuators may be constructed of different dimensions to change the effective forces or pressures on the clamping die section 125, the bending shoe sections 162 and 180 and on the piston of the reaction or cushioning cylinder 196.

The tube bending apparatus is adapted to perform bending operations upon tubes or pipes of different diameters. With reference to the carriage construction 312, shown in FIGS. 3 and 4, the pipe gripping jaws 400, the cam slots 407 and the cam rollers 409 may be proportioned to provide for sufficient movement of the jaws to accommodate tubes of different diameters. Where a tube of a different diameter is to be configurated with bends, the operator releases the locking nut 386, shown in FIG. 3, and rotates the nut or member 384 to elevate or lower the plate 370 to raise or lower the gripping shoes 400 to compensate for the change in the center axis of a tube or pipe of different diameter.

When a different size of pipe is to be bent, the components shown in FIG. 13 of different dimensions are employed to fit the size of tube or pipe. These components include the stationary bending die or matrix 107, the clamping shoes 118 and 125, the spacer block 153 for the movable clamping die and the spacer block 172 for the bending die, and the bending die or wiper shoe sections 162 and 180 replaced with sections dimensioned to fit the different diameter of tube or pipe.

The auxiliary or supplemental bending die or wiper shoe section 180 is normally utilized in association with the die or wiper shoe section 162 in order to provide additional surface area for engagement with the tube or pipe in the fashioning of a long bend or bend of substantial depth. In instances in bending tubing where the distance between successive bends is comparatively short, the auxiliary or supplemental bending shoe section 180 is readily removable to facilitate forming a short bend.

FIGS. 1 and 2 illustrate a preferred position of the bending apparatus with the apparatus generally arranged at angular positions in two different planes. In FIG. 1 it will be seen that the rectilinear axis of the tube 40 is at an angle of about 15° with respect to the floor surface 21 engaged by the castors 20 and 24 so that the bending apparatus or module is at about a 15° angle with respect to a vertical axis normal to the floor surface. Exhaust and tail pipes for vehicle installation are usually several feet in length, being upwards of 12 feet or more in length for some vehicles.

Usually a substantial number of bends is required in most exhaust pipe and tail pipe constructions in order to avoid interference with structural components or frame members of the vehicle, and such bends are at various angles and of various depths. By inclining the apparatus about 15° whereby the axis of the tube 40 is at an angle of about 15° with respect to the floor surface supporting the apparatus, successive bends may be impressed or formed in the tube or pipe without the right-hand end of the bent region of the tube, as viewed in FIG. 1, impinging or engaging the floor surface 21. Through this angular arrangement of the bending apparatus or module with respect to a supporting surface, it is unnecessary to provide a pit or excavation to accommodate the bent pipe as successive bends are formed.

As shown in FIG. 2, the bending apparatus or module is arranged in a forwardly inclined or angular position at about 45° with respect to the floor surface 21. This angularity of the apparatus facilitates access and use of the machine by the operator, particularly providing easy access to the controls. While the angularities for the position of the bending apparatus or module above-described have been found preferable, it is to be understood that these angularities may be varied depending upon the place of use of the apparatus.

It should be noted that the components of the bending apparatus are mounted upon a single frame construction 29 so that the tube-bending module provided by the assembly on the frame construction 29 may be mounted in other positions or may be mounted in a suspended position if desired.

This versatility of position is rendered possible as the hydraulic tubes or connections between the oil pump and the manifold 39 and between the manifold and the actuated components of the module are flexible whereby the reservoir or tank 20, motor 32 and oil pump 34 may be disposed in positions other than the positions illustrated herein.

It will be apparent that the method of bending a thin-walled metal tubing or pipe is inclusive of the steps of restraining or clamping the tubing against longitudinal movement preparatory to forming a bend in the tubing and exerting a force laterally against the tubing at a localized region adjacent the tube clamping means to effect initial cold flow or displacement of the metal at the localized region.

Bending of the tubing is performed by continuing the application of lateral force against the tubing at a zone adjacent the predisplaced metal, the bending shoe 162 wiping the tubing about the stationary matrix 107 in an arcuate configuration to form a bend. The stretching of the metal of the clamped portion of the tube during bending is in appreciable, the tendency for the metal at the region of the clamps 118 and 125 to be stretched being further restrained by the displaced metal anchored in the pocket 185.

The bending apparatus of the invention embodying the rectilinearly movable scale 250 enables the use of equally spaced graduations or indicia 252 which may directly indicate degrees of angularity of a bend or may be arranged with different spacing providing encoding of linear increments of movement of the scale 250.

As the axis of revolution of the sector 230, shown in FIG. 1, is at the axis of the crankshaft 164 and, as the crankshaft axis and the limit switch member 296 move upwardly at the same rate during a bending operation, the graduations or indicia 252 may be equally spaced irrespective of whether or not they directly indicate degrees of angularity of a bend as they may be encoded by numerals or other characters. The same principle applies to the numerals on the scale 356 in a lengthwise recess 358 in the threaded shaft or bar 304 so long as the numerals or characters 356 represent units of length of movement of the carriage 312 and the positions of the radial openings 363 in the nut 322 indicate subdivisions of the increments of length represented by the numerals on the scale 356 or other suitable characters or indicia. It is to be understood that while the embodiment of the invention illustrated is particularly adapted for forming successive bends in thin-walled tubular metal stock, tubing or pipe utilized as exhaust pipe or tail pipe in exhaust systems for internal combustion engines of automotive vehicles, the bending apparatus is adaptable for bending tubing or tubular stock for other uses.

It is apparent that, within the scope of the invention, modifications and different arrangements may be made other than as herein disclosed, and the present disclosure is illustrative merely, the invention comprehending all variations thereof.

I claim:

1. Apparatus for bending metal tubing including, in combination, frame means, a slide member mounted for reciprocation relative to the frame means, a stationary die mounted by the frame means, a bending die, shaft means journally mounted on the slide member supporting the bending die, clamping means for securing the metal tubing against longitudinal movement during a bending operation, means for reciprocating the slide member to effect relative rotation of the shaft means and the bending die, actuating means for the clamping means, means for controlling the depth of bend formed in the tubing including a rectilinearly movable member, motion translating means for transmitting rotational movement of said shaft means to effect rectilinear movement of the rectilinearly movable member, an index element mounted by said rectilinearly movable member for adjustment along said member, a scale having graduations for cooperation with said index element, the relative position of said index element with respect to the graduations on the scale determining the depth of bend to be formed in the tubing, and control means activated by said index element for interrupting bending movement of the bending die when a predetermined depth of bend in the tubing has been effected.

2. Apparatus for bending metal tubing including, in combination, frame means, a slide member mounted for reciprocation relative to the frame means, a stationary die mounted by the frame means, a bending die, shaft means journally mounted on the slide member supporting the bending die, relatively movable clamping means for holding the metal tubing adjacent the stationary die, actuating means for reciprocating the slide member to effect relative rotation of the shaft means and the bending die, means for actuating the clamping means to clamping and release positions, means for controlling the depth of bend formed in the tubing including an element rotatable with the shaft means, a rectilinearly movable member mounted by the frame means and arranged to be actuated by said rotatable element, an index element mounted by said rectilinearly movable member for adjustment along said member, a scale having graduations for cooperation with said index element, the relative position of said index member with respect to the graduations on the scale determining the depth of bend to be formed in the tubing, and control means activated by said index member for interrupting movement of the slide member to terminate bending movement of the bending die when a predetermined depth of bend in the tubing has been effected.

3. The combination according to claim 2 wherein the index element is provided with a cam surface, the control means including a limit switch which is engaged by the cam surface for interrupting the actuating means for reciprocating the slide member.

4. Apparatus for bending metal tubing including, in combination, frame means, a slide member mounted for reciprocation relative to the frame means, a stationary die mounted by the frame means, a bending die, shaft means journally mounted on the slide member supporting the bending die, relatively movable clamping means for holding the metal tubing adjacent the stationary die, actuating means for reciprocating the slide member to effect relative rotation of the shaft means and the bending die, means for actuating the clamping means to clamping and release positions, means for controlling the depth of bend formed in the tubing including a member having peripheral teeth rotatable with the shaft means, a rectilinearly movable member having rack teeth associated therewith enmeshed with the teeth of the rotatable member, an index element, a control element for cooperation with the index element, one of said elements being movable with the rectilinearly movable member, one of said elements being adjustable for predetermining the depth of a bend to be formed, and means rendered effective upon said elements being in a predetermined relation for interrupting movement of the bending die when a predetermined depth of bend in the tubing has been effected.

5. The combination according to claim 4 wherein the index element is movable with the rectilinearly movable member and the control element is movable with the slide member.

6. Apparatus for bending metal tubing including, in combination, frame means, a slide member mounted for reciprocation relative to the frame means, a stationary die mounted by the frame means, a bending die, shaft means journally mounted on the slide member and supporting the bending die, relatively movable clamping means for holding the metal tubing adjacent the stationary die, a hydraulic actuator for reciprocating the slide member to effect relative rotation of the shaft means and the bending die, means for actuating the clamping means to clamping and release positions, means for controlling the depth of bend formed in the tubing including a toothed member rotatable with the shaft means, a rectilinearly movable member having a rack portion, the teeth of the rack portion being enmeshed with the teeth of the rotatable member, an index element adjustably mounted by the rectilinearly movable member and movable therewith, a scale having graduations cooperating with the adjustable index element for predetermining the depth of bend to be formed in the tubing, valve means for controlling flow of fluid to said hydraulic actuator, and control means activated by the index element for interrupting fluid flow to the hydraulic actuator to thereby complete a bending movement of the bending die.

7. The combination according to claim 6 wherein the index element is provided with a cam surface, the control means including a limit switch engaged by the cam surface to actuate the valve means and interrupt flow of fluid to the hydraulic actuator.

8. The combination according to claim 7 wherein the limit switch is mounted for movement with the slide member.

9. The combination according to claim 6 wherein the means for actuating the clamping means includes a second hydraulic actuator, and fluid reaction means effective during formation of a bend for resisting rotational movement of the bending die.

10. Apparatus for bending a metal tube including, in combination, frame means, a slide member mounted for reciprocation relative to the frame means, a stationary die mounted by the frame means, a bending die, crankshaft means journally mounted on the slide member carrying the bending die for movement relative to the stationary die, clamping means for holding the metal tube adjacent said dies, means for actuating the clamp means to tube clamping and release positions, adjustable means associated with and actuated by said slide member for determining the depth of bend formed in the tube, a tube control carriage, means supporting the carriage for rectilinear movement in a direction normal to the direction of reciprocatory movement of the slide member, a threaded shaft, an indexing member engageable with the threaded shaft, said indexing member being movable with the carriage, means for effecting relative movement between the threaded shaft and said indexing member for longitudinally moving the carriage along the shaft, tube-gripping means mounted by the carriage, means for actuating the tube-gripping means to tube-gripping and release positions, means for indicating linear movement of the carriage lengthwise of the threaded shaft including characters associated with the threaded shaft indicating units of linear distance along the shaft, said indexing member having a plurality of circumferentially spaced means arranged in spaced relation lengthwise of the threaded shaft for registration with the characters on the shaft for indicating subincremental distances dependent upon the relative position of the indexing member with respect to the threaded shaft, and means for effecting rotation of the tube gripping means relative to the carriage for rotating the tube to determine the angularity of the bend to be formed with respect to the preceding formed bend.

11. The combination according to claim 10 including means for locking the carriage in adjusted positions relative to said threaded shaft, and means for locking said tube-gripping means in positions of rotation relative to said carriage.

12. The combination according to claim 10 wherein the indexing member is rotatably supported by the carriage.

13. Apparatus for bending a metal tube including, in combination, frame means, a slide member mounted for reciprocation relative to the frame means, a stationary die mounted by the frame means, a bending die, crankshaft means journally mounted on the slide member carrying the bending die for movement relative to the stationary die, clamping means for holding the metal tube adjacent said dies, means for actuating the clamp means to tube gripping and release positions, adjustable means associated with and actuated by said slide member for determining the depth of bend formed in the tubing, a tube control carriage, means supporting the carriage for rectilinear movement in a direction normal to the direction of reciprocatory movement of the slide member, a threaded shaft, an indexing member having operative engagement with the threaded shaft, said indexing member being movable with the carriage, means for effecting relative movement between said threaded shaft and said indexing member for effecting longitudinal movement of the carriage along the threaded shaft, tube-gripping means mounted by the carriage, means for actuating the tube gripping means to tube gripping and release positions, means for indicating linear movement of the carriage lengthwise of the shaft including characters associated with the threaded shaft indicating units of linear distance along the shaft, said indexing member having radial openings spaced circumferentially and in lengthwise arranged echelon for indicating subdivisions of the unit distances represented by the characters associated with the threaded shaft dependent upon the relative position of rotation of the indexing member with respect to the threaded shaft, means for effecting rotation of the tube gripping means relative to the carriage for rotating the tube including a protractor member mounted by the carriage and having circumferentially spaced graduations thereon, an arm associated with the tube-gripping means and cooperating with the graduations on said protractor member, means for locking the arm to the protractor member for securing the tubing in a predetermined position of rotation for determining the angularity of a bend to be formed with respect to the angularity of the preceding formed bend in the tube, and means for locking the carriage in an adjusted position relative to the threaded shaft.

14. The combination according to claim 13 wherein the tube-gripping means mounted by the carriage includes a plate having an opening, a pair of tube-gripping shoes, a shoe actuating member rotatable in the opening, means associated with the actuating member having guide surfaces for slidably accommodating the tube-gripping shoes, and means associated with the shoe actuating member engaging surfaces on said shoes whereby rotation of the shoe actuating member affects slidable movement of the shoes for gripping and releasing the tube.

15. The combination according to claim 14 including guide rods for the plate, said plate being slidable along said guide rods, and means for adjusting the position of said plate along the guide rods whereby to vary the initial position of the tube-gripping shoes to accommodate tubes of various diameters.

16. Apparatus for bending a metal tube including, in combination, frame means, a slide member mounted for reciprocation relative to the frame means, a stationary matrix mounted by the frame means, crankshaft means journally mounted on the slide member and having a ledge portion offset from the axis of the crankshaft means, a tube bending body supported upon said ledge portion and arranged for cooperation with the stationary matrix for impressing a bend in a tube, a relatively stationary clamp means disposed adjacent the matrix, a movable clamp means for cooperation with the stationary clamp means for restraining longitudinal movement of the tube, a first hydraulic actuator for actuating the movable clamp means, a second hydraulic actuator for reciprocating the slide member, a reciprocable bar associated with said slide member, motion translating means for transmitting rotational movement of said crankshaft means to effect rectilinear movement of said bar, an index element adjustable along said bar, a scale bearing graduations for cooperation with said index element for predetermining the angle of bend to be formed in a tube, solenoid operated valve means for controlling flow of fluid to and away from the hydraulic actuators, a control circuit for said valve means, a limit switch for cooperation with said index element activating said solenoid valve means to interrupt fluid flow to the second hydraulic actuator for limiting the extent of a bend being formed in the tube, a hydraulic reaction means resisting rotational movement of the pipe bending body during the formation of a bend, a tube control carriage including a carriage block mounted for longitudinal movement in a direction normal to the reciprocatory movement of the slide member, said block having an opening, a threaded shaft mounted by the frame means extending through the opening in said block, an indexing member rotatably mounted by the block and arranged for engagement with the threaded shaft, said shaft having lengthwise arranged spaced characters indicating linear distances, said indexing member having means for cooperation with the characters on said shaft for indicating subdivisions of the distance between adjacent characters, and tube-gripping means mounted by said tube control carriage.

17. The combination according to claim 16 wherein the tube-gripping means includes a plate, rod means secured to the block, said plate being adjustably supported by the rod means, an annular member rotatable in an opening in said plate, tube-gripping jaws slidably mounted by guide surfaces on the annular member, a rotatable manipulating sleeve, pin and slot means connecting the sleeve with said tube-gripping jaws whereby rotation of the sleeve effects relative slidable movement of the jaws for gripping and releasing a tube, a protractor member carried by said plate, an arm secured to the annular member and cooperating with said protractor member for rotating the annular member and the tube-gripping jaws to rotate the tube when the latter is engaged by the tube-gripping jaws, means on said arm cooperating with the protractor member for releasably locking the arm to the protractor member, and means for adjusting the position of said plate along said rods to adapt the tube-gripping jaws for gripping tubes of different diameters.

18. The combination according to claim 16 wherein the indexing member cooperating with the threaded shaft is provided with peripherally spaced radial openings, said radial openings being arranged in lengthwise echelon relation with respect to the axis of the nut, and an identifying character adjacent each opening for encoding the specifications for forming successive bends in a tube.

19. The combination according to claim 16 including a stationary way bar disposed in parallelism with the threaded shaft, and releasable locking means engageable with the way bar for locking the carriage in adjusted positions.

20. Apparatus for bending a metal tube including, in combination, frame means, a slide member mounted for reciprocation relative to the frame means, a stationary matrix mounted by the frame means, crankshaft means journally mounted on the slide member and having a ledge portion offset from the axis of the crankshaft means, a tube bending body supported upon said ledge portion and arranged for cooperation with the stationary matrix for impressing a bend in a tube, a relatively stationary clamp means disposed adjacent the matrix, a movable clamp means for cooperation with the stationary clamp means for restraining longitudinal movement of the tube, a first hydraulic actuator for actuating the movable clamp means, a second hydraulic actuator for reciprocating the slide member, a reciprocable bar associated with the slide member supporting a toothed rack, a sector-shaped member rotatable with said crankshaft means having teeth enmeshed with the toothed rack to effect rectilinear movement of said bar, an index element adjustable along said bar, a scale bearing graduations for cooperation with said index element for predetermining the angle of bend to be formed in a tube, solenoid operated valve means for controlling flow of fluid to and away from the hydraulic actuators, a control circuit for said valve means, a limit switch for cooperation with said index element for influencing said solenoid valve means to interrupt fluid flow to the second hydraulic actuator for limiting the extent of a bend being formed in the tube, a hydraulic reaction means resisting rotational movement of the pipe bending body during the formation of a bend, a tube control carriage including a carriage block mounted for longitudinal movement in a direction normal to the reciprocatory movement of the slide, said block having an opening, a threaded shaft mounted by the frame means extending through the opening in said block, an indexing member rotatably mounted by the block and arranged for engagement with the threaded shaft, said threaded shaft having lengthwise arranged spaced characters indicating linear distances, said rotatable indexing member having means for cooperation with the characters on said shaft for indicating subdivisions of the distance between adjacent characters, rod means secured to the block, a plate adjustably supported by the rod means, an annular member rotatable in an opening in said plate, tube-gripping jaws slidably mounted by parallel guide surfaces on the annular member, a rotatable manipulating sleeve, pin and slot means connecting the sleeve with said jaws whereby rotation of the sleeve effects relative slidable movement of the jaws for gripping and releasing a tube, a protractor member mounted by said plate, an arm secured to the annular member and cooperating with said protractor member for rotating the annular member and the tube-gripping jaws for rotating the tube when the latter is engaged by the tube-gripping jaws, means on said arm cooperating with the protractor member for releasably locking the arm to the protractor member, means for adjusting the position of said plate along said rods to adapt the tube-gripping jaws for gripping tubes of different diameters, and means for locking the tube control carriage in adjusted positions.

* * * * *